(12) United States Patent
Tanaka et al.

(10) Patent No.: US 7,934,132 B2
(45) Date of Patent: Apr. 26, 2011

(54) COMMUNICATION SYSTEM AND METHOD FOR CONTROLLING THE SAME

(75) Inventors: Akihiro Tanaka, Tokyo (JP); Akio Tajima, Tokyo (JP); Seigo Takahashi, Tokyo (JP); Wakako Maeda, Tokyo (JP)

(73) Assignee: NEC Corporation, Tokyo (JP)

( * ) Notice: Subject to any disclaimer, the term of this patent is extended or adjusted under 35 U.S.C. 154(b) by 1327 days.

(21) Appl. No.: 11/482,131

(22) Filed: Jul. 7, 2006

(65) Prior Publication Data

US 2007/0009098 A1 Jan. 11, 2007

(30) Foreign Application Priority Data

Jul. 8, 2005 (JP) ................................. 2005-200938

(51) Int. Cl.
*G06F 11/00* (2006.01)
*G01R 31/28* (2006.01)
*H04B 17/00* (2006.01)
*H04L 1/20* (2006.01)

(52) U.S. Cl. ......... 714/715; 714/707; 375/224; 370/242

(58) Field of Classification Search .......... 714/704–707, 714/712–717, 742, 744; 370/216, 241–252; 375/224–228; 455/8, 423
See application file for complete search history.

(56) References Cited

U.S. PATENT DOCUMENTS

| | | | |
|---|---|---|---|
| 6,266,377 B1 * | 7/2001 | Velez et al. | 375/261 |
| 6,915,127 B2 * | 7/2005 | Sakuma | 455/423 |
| 7,349,545 B2 * | 3/2008 | Kim | 380/283 |
| 7,522,835 B1 * | 4/2009 | Guertin et al. | 398/14 |
| 2001/0038695 A1 | 11/2001 | Kim | |
| 2003/0224777 A1 * | 12/2003 | Sakuma | 455/423 |
| 2004/0190725 A1 | 9/2004 | Yuan et al. | |
| 2005/0078827 A1 | 4/2005 | Tajima | |

FOREIGN PATENT DOCUMENTS

JP 2006-352373 12/2006

OTHER PUBLICATIONS

Fertner, A.; Solve, C.;, "Symbol-rate timing recovery comprising the optimum signal-to-noise ratio in a digital subscriber loop," Communications, IEEE Transactions on , vol. 45, No. 8, pp. 925-936, Aug. 1997 doi: 10.1109/26.618296.*

(Continued)

*Primary Examiner* — Cynthia Britt
(74) *Attorney, Agent, or Firm* — Whitham Curtis Christofferson & Cook, PC

(57) ABSTRACT

For an error rate QBER, threshold values are preset, including a threshold value $Q_{bit}$ for frame synchronization processing, a threshold value $Q_{phase}$ for phase correction processing, and a threshold value $Q_{Eve}$ for eavesdropping detection. Upon the distribution of a quantum key from a sender to a receiver, when the measurement value of QBER is deteriorated more than $Q_{bit}$, frame synchronization processing is performed. When the measurement value of QBER is deteriorated more than $Q_{phase}$, phase correction processing and frame synchronization processing are performed. When QBER does not become better than $Q_{Eve}$ even after these recovery-processing steps are repeated N times, it is determined that there is a possibility of eavesdropping, and the processing is stopped.

21 Claims, 20 Drawing Sheets

OTHER PUBLICATIONS

Younggyun Kim; Jaekyun Moon; , "Phase error compensation for improved timing recovery," Magnetics, IEEE Transactions on , vol. 36, No. 5, pp. 2190-2192, Sep. 2000 doi: 10.1109/20.908353.*

Tanaka et al. "Temperature independent OKD system using alternative-shifted phase modulation method". Lutkenhaus "Estimates for practical quantum cryptography" The American Physical Society, vol. 59, No. 5; May 1999.

Willamson et al. "Eavesdropping on pratical quantum cryptography" Jul. 8, 2004; pp. 1-13.

Tomita et al. "Balanced, gated-mode photon detector for quantum-bit discrimination at 1550 nm" Optics Letters, vol. 27, No. 20; Oct. 15, 2002.

Maeda et al. High-speed QKD : system synchronized by automatic phase-alignment mechanism.

Bennett et al. "Quantum Cryptography: Public key distribution and coin tossing" pp. 175-179 International Conference on Computers; Dec. 10-12, 1984.

Ribordy et al. "Automated 'plug & play' quantum key distribution" Electronic Letters, vol. 34, No. 22; Oct. 29, 1998.

European Search Report dated Sep. 26, 2006.

Japanese Office Action dated Jan. 13, 2011.

* cited by examiner

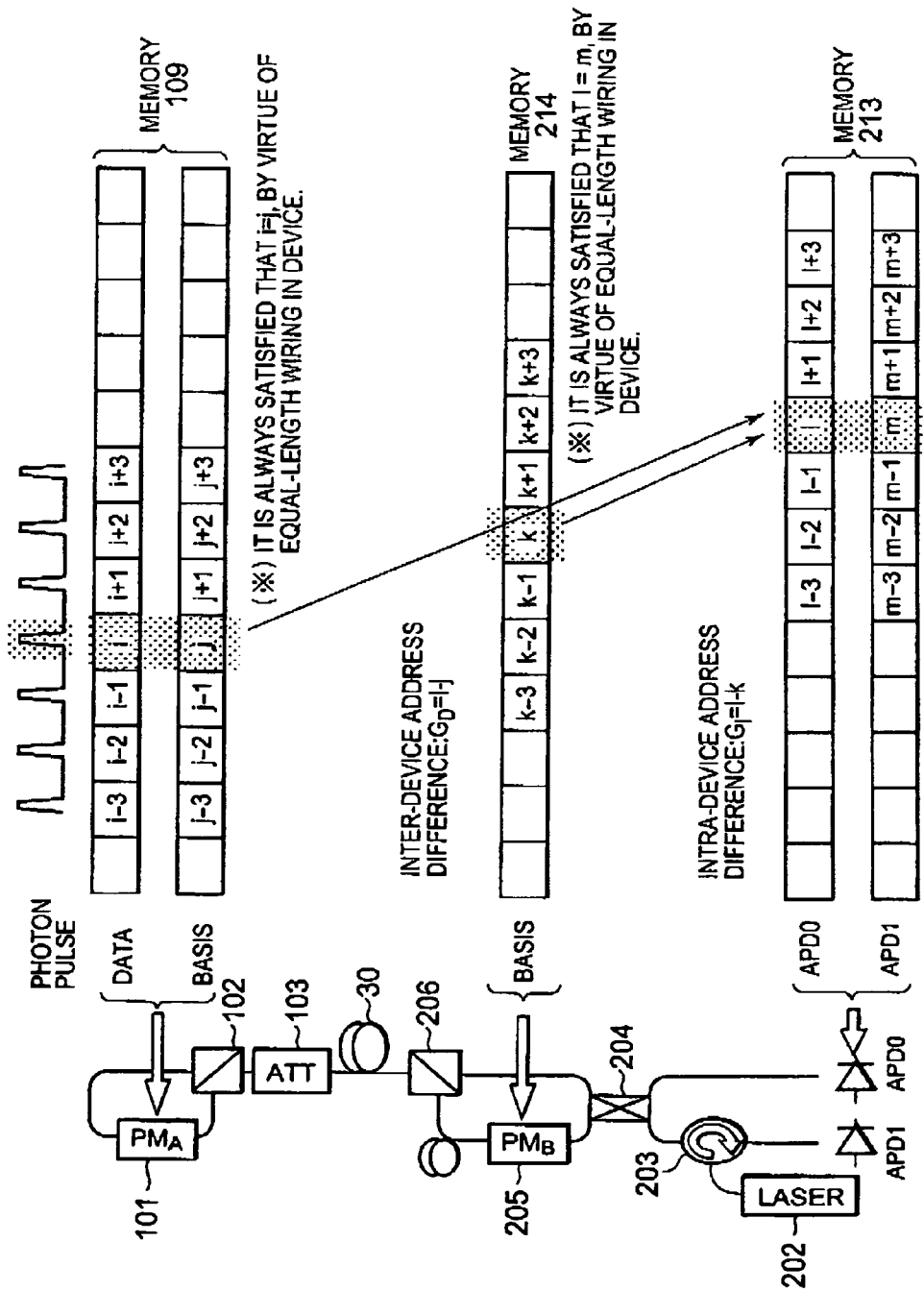

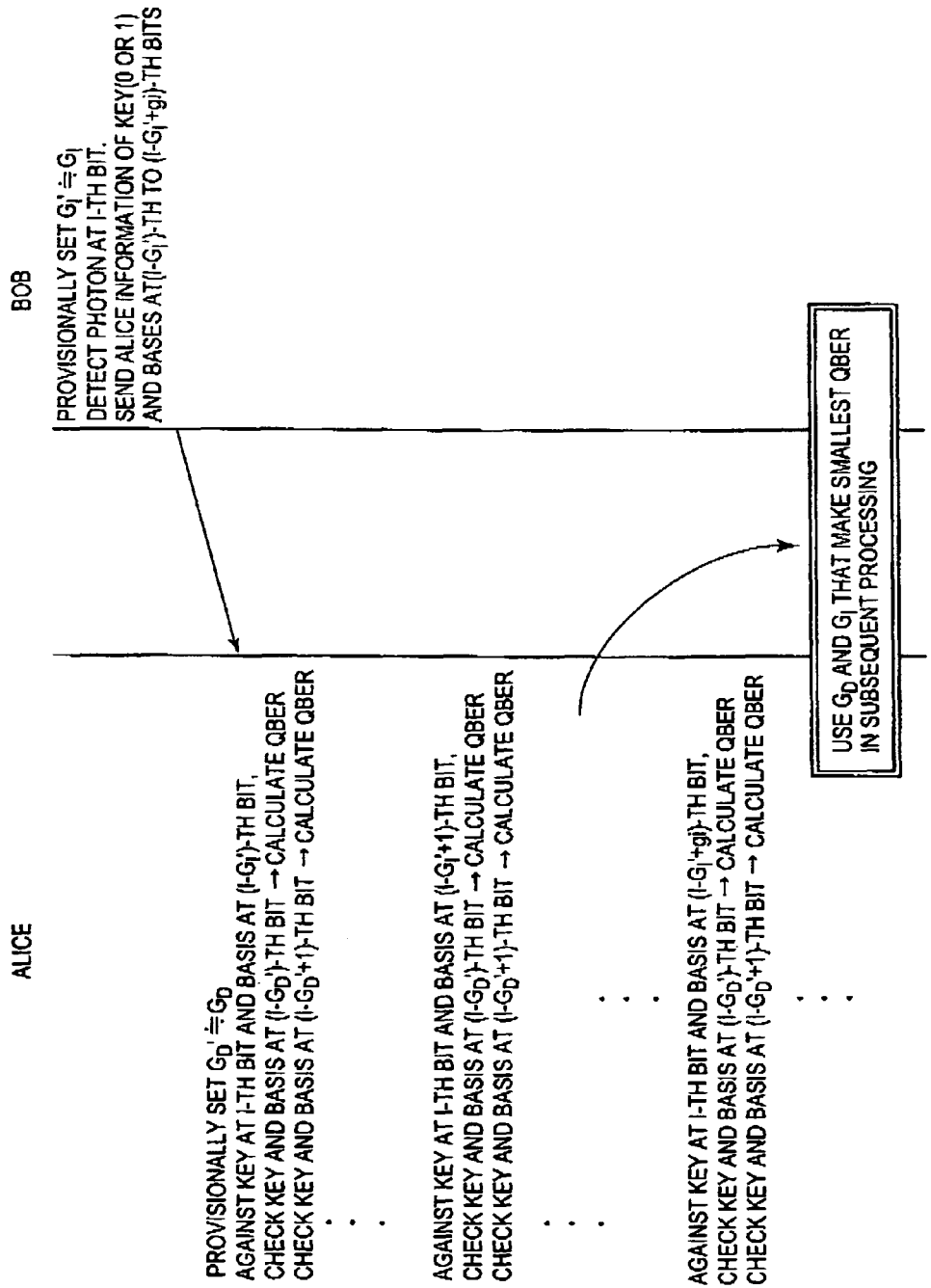

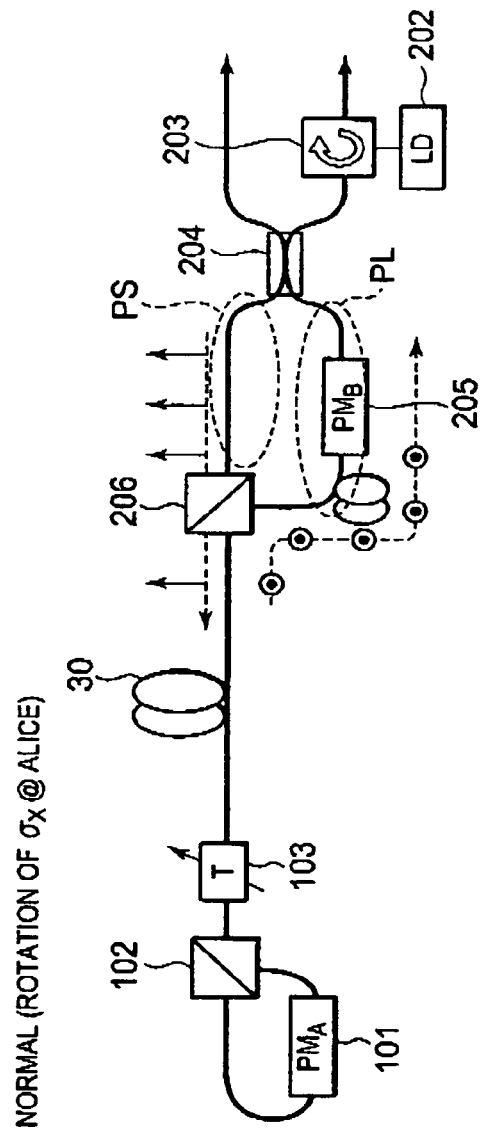
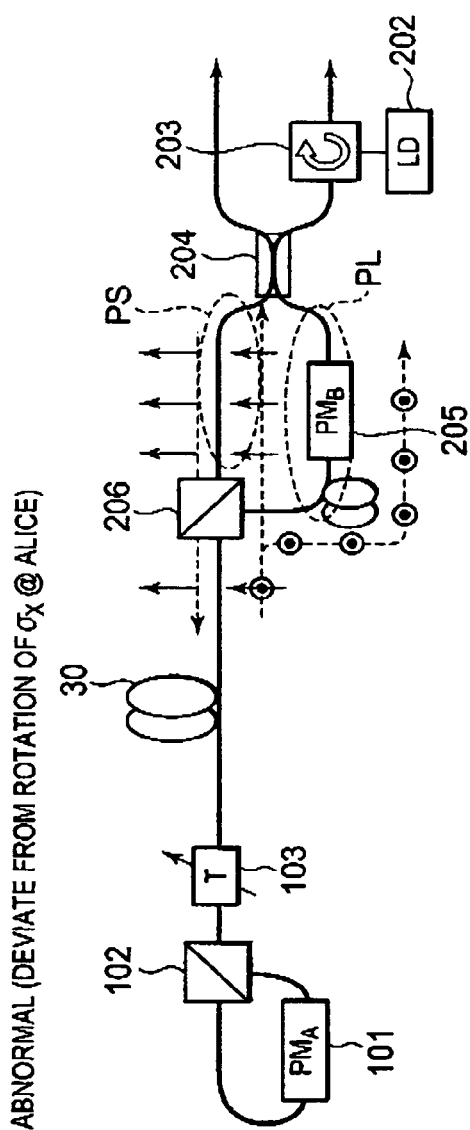

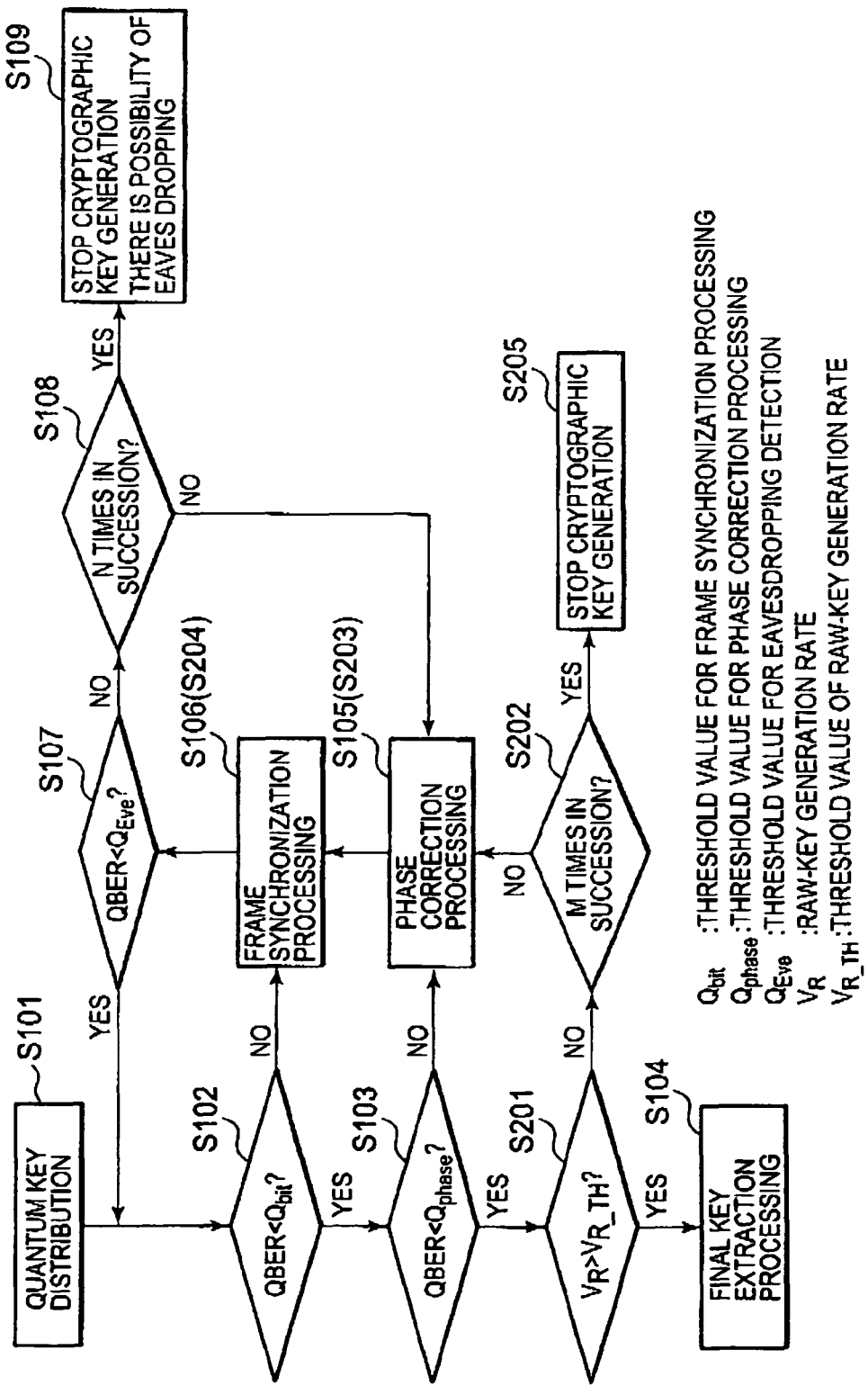

COMMUNICATION SYSTEM AND METHOD FOR CONTROLLING THE SAME

BACKGROUND OF THE INVENTION

1. Field of the Invention

The present invention relates to a system and method for monitoring degradation in the communication quality of a communication system and, when detecting it, recovering from the degradation.

2. Description of the Related Art

The internet, which continues growing rapidly, is convenient on one hand, but its security is quite uncertain on the other hand. There is an increasing need for cryptographic technologies in order to maintain the secrecy of communications. Cryptographic schemes currently used in general can be classified into two categories: private key cryptography such as DES (Data Encryption Standard) and triple DES, and public key cryptography such as RSA (Rivest Shamir Adleman) and ECC (Elliptic Curve Cryptography). However, these techniques are cryptographic communication methods that ensure the security of communications based on the "complexity of computation" and are always fraught with the danger that ciphertext could be broken with the advent of an algorithm enabling a vast amount of computation or a cryptanalysis algorithm. With such a background, quantum key distribution (QKD) systems receive attention as the cryptographic key distribution technologies that are "absolutely immune against eavesdropping."

In QKD, a photon is generally used as a communication medium, and transmission is performed by superimposing information on the quantum state (such as polarization and phase) of the photon. An eavesdropper present on a transmission line intercepts the information by tapping photons being transmitted, or by other methods. However, according to the Heisenberg's uncertainty principle, it is impossible to perfectly return the quantum state of a photon once observed to its original state before observation, and resultantly, a change occurs in the statistic values of received data detected by a legitimate receiver. By monitoring this change, the receiver can detect the presence or absence of an eavesdropper on the transmission line.

In the case of a quantum key distribution method utilizing the phase of a photon, a sender/transmitter and a receiver (hereinafter, referred to as "Alice" and "Bob" respectively, as have been used traditionally) constitute an optical interferometer. Alice and Bob individually perform random phase modulation on each of single photons. Output of 0 or 1 is obtained depending on the difference between the depths of these phase modulations. Thereafter, Alice and Bob check part of the respective conditions they used when the output data were measured against each other, whereby the same bit string can be shared between Alice and Bob finally. Next, the most typical quantum key distribution algorithm by the name of BB84 protocol will be described briefly (see Bennett and Brassard, "Quantum Cryptography: Public Key Distribution and Coin Tossing," IEEE International Conference on Computers, Systems and Signal Processing, Bangalore, India, pp. 175-179.)

FIG. 1 is a schematic diagram showing a concept of a quantum key distribution method according to the BB84 protocol. Here, it is assumed that Alice 141 and Bob 143 are connected through an optical transmission line 142.

According to this method, Alice 141 has two random number sources, one of which (random number 1) provides random numbers representing cryptographic key data (0/1), and the other one of which (random number 2) is for determining the way of coding the information of the random number 1. In quantum key distribution methods utilizing the phase of a photon, two coding sets are used: a coding set for representing a set of phases of 0 and $\pi$ that correspond to "0" and "1" in the cryptographic key, respectively (hereinafter, this set will be referred to as "+basis"), and a coding set for representing a set of phases of $\pi/2$ and $3\pi/2$ that correspond to "0" and "1" in the cryptographic key, respectively (hereinafter, this set will be referred to as "× basis"). The random number 2 is used to make a selection from the two bases. That is, any one of the four types of modulation (0, $\pi/2$, $\pi$, $3\pi/2$) is randomly performed on each of single photons, which are then sent to Bob one by one.

On the other hand, Bob 143 has a random number source (random number 3) corresponding to the bases and uses it to decode the single photons sent from Alice 141. When a value of the random number 3 is "0", a modulation of 0 phase (+ basis) is performed on a photon. When a value of the random number 3 is "1", a modulation of $\pi/2$ phase (× basis) is performed on a photon. Here, random numbers obtained as the output of the optical interferometer are collectively referred to as random number 4.

When a basis Alice used in modulation is the same as a basis Bob used in modulation (random number 2=random number 3), Bob can correctly detect a value of the Random number 1 (random number 1=random number 4). When a basis Alice used in modulation is different from a basis Bob used in modulation (random number 2≠random number 3), Bob randomly obtains a value of 0 or 1 for the random number 4, independently of a value of the random number 1. Since each of the random numbers 1, 2 and 3 is a collection of random numbers varying with each one bit, the probability that a basis match occurs and the probability that no basis match occurs are both 50%. However, since those bits corresponding to the non-matching bases are removed through basis reconciliation at a subsequent stage, Alice 141 and Bob 143 can share a bit string composed of 0s and 1s based on the random number 1.

However, the bit string thus shared contains errors caused by the transmission line 142 and/or the receiver, and therefore, to correct these errors, error correction processing is needed. In addition to this, errors also occur in the shared bit string when an eavesdropper present on the transmission line intercepts the photon information. Accordingly, to share a cryptographic key for final use, not only the error correction processing for correcting errors, privacy amplification is also needed to reduce the amount of information that conceivably has been intercepted, based on the frequency of errors (error rate). Incidentally, methods of estimating "the amount of information that conceivably has been intercepted" are described in the following documents:

N. Lutkenhaus, "Estimates for practical quantum cryptography," Physical Review A, Vol. 59, No. 5, p. 3301 (hereinafter, this document will be referred to as Lutkenhaus); and M. Williamson, "Eavesdropping on practical quantum cryptography," quantum-ph/0211155 (hereinafter, this document will be referred to as Williamson).

FIG. 2 is a flowchart showing a flow of quantum key generation in general. Among original random numbers for a cryptographic key (source of key) sent from Alice, most amount of the information is lost through quantum key distribution (single-photon transmission) S1. A key shared between Alice and Bob at this stage is called a raw key. The key that has lost approximately one half the amount of information after basis reconciliation S2 mentioned above, is called a sifted key. Thereafter, error correction S3 for correcting errors that were contained in the key at the stage of quantum key distribution is carried out, followed by privacy amplification S4 for eliminating the amount of information that conceivably has been leaked to an eavesdropper. Then, the remains are made to be a final key, which will be actually used as a cryptographic key.

However, if an attempt is made to implement the above-described quantum key distribution in a real world, there are some cases where the above-mentioned error rate is increased due to various factors. Conventionally, an increase in the error rate means the presence of an act of eavesdropping. Therefore, whenever an increase in the error rate is detected, generation of a cryptographic key needs to be stopped.

For example, a change in the environmental temperature might cause delay variation in an optical transmission line and/or among electric circuits, resulting in the occurrence of a deviation between the timing when a photon is passing through a phase modulator, or the timing when a photon arrives at a photon detector, and the timing of driving these devices in accordance with a clock signal. If the error rate is increased due to this deviation, a cryptographic key cannot be generated as a result. Hereinafter, a deviation between the timing of the passage/arrival of a photon and the clock timing will be referred to as "phase deviation," and the processing for correcting the phase deviation to exactly synchronize these timings will be referred to as "phase correction processing."

Moreover, since information is superimposed on signal photons for transmission, many of bits are lost on the way along a transmission line. Consequently, incorrect recognition of a bit-to-bit correspondence is likely to occur between Alice and Bob. This incorrect recognition causes deterioration in the error rate, and resultantly, generation of a cryptographic key cannot be performed. Hereinafter, a state where synchronization of information bits is established between Alice and Bob, that is, a state where correct recognition of a bit-to-bit correspondence is established between Alice and Bob, will be referred to as "frame synchronization." In addition, a state where a bit-to-bit correspondence is incorrectly recognized will be referred to as "frame synchronization deviation," and the processing for correctly adjusting the state of frame synchronization deviation to the state of frame synchronization will be referred to as "frame synchronization processing."

FIG. 3 is a flowchart showing an example of a conventional supervisory control method. As shown in FIG. 3, according to the conventional method, a threshold value $Q_{Eve}$ for eavesdropping detection is set in advance. When the error rate QBER (Quantum Bit Error Rate) becomes equal to or larger than $Q_{Eve}$, it is determined that there is a possibility of eavesdropping, and the cryptographic key generation is stopped. Then, the processing for recovering from the degradation in the system performance is carried out, whereby the system restores its performance it had before degradation. Hereinafter, this processing will be referred to as "system recovery."

As described above, there are plural factors for deterioration in the rate of cryptographic key generation. However, in a conventional quantum key distribution technology, since deterioration in the error rate is construed all alike as the presence of an act of eavesdropping, it is necessary to stop cryptographic key generation and perform system recovery when an increase in the error rate is detected, as shown in FIG. 3. That is, when a fault is detected during cryptographic key generation, there is no other choice but to use a method of restarting cryptographic key generation in which a cause of the fault is manually analyzed; it is checked that a key can be generated safely; all the setups of the devices are then performed from the start. Accordingly, it has been impossible to achieve efficient cryptographic key generation.

Therefore, the present inventors have focused attention on the fact that, for degradation in the performance of a communication system, there are various factors, which should not be treated alike, and each of the plurality of degradation factors appears as a communication-degrading phenomenon peculiar to the factor.

When conventional technologies are reviewed from this point of view, no conventional technology has introduced a concept of separating the degradation factors. Therefore, in a quantum key distribution system to which a conventional supervisory control method is applied, when deterioration occurs in the error rate, cryptographic key generation is stopped, with this deterioration being regarded as due solely to an act of eavesdropping, irrespective of whether the deterioration has occurred due to delay variation caused by change in the environmental temperature, or due to unavoidable extinction of bits during single-photon transmission, or due to a fault of a component, or due to an act of eavesdropping.

SUMMARY OF THE INVENTION

An object of the present invention is to solve such conventional problems and to provide an efficient and stable communication system and a system control method that enables efficient and stable operation.

According to the present invention, at least one item to monitor (monitored item) and a fault-detection threshold for each monitored item are previously set. Based on such monitored item and its fault-detection threshold, a fault is identified, and then appropriate recovery is performed depending on the identified fault. The monitored item may be an error rate, a change rate of the error rate, a shared data generation rate, or the like.

A method for controlling a communication system in which a first communication device communicates with a second communication device through a transmission line, includes: setting at least one fault-detection threshold for each monitored item; comparing a measured value for each monitored item with at least one fault-detection threshold set for the monitored item, to determine whether a corresponding fault occurs; and when it is determined that the corresponding fault occurs, performing recovery of the communication system from the corresponding fault.

In the communication system, preferably, the first and second communication devices are synthesized to each other; first data stored in the first communication device is transmitted to the second communication device according to an operation timing synchronized between the first and second communication devices; and shared data between the first and second communication devices is generated based on second data which the second communication device has received from the first communication device.

The monitored item may be an error rate which is obtained by comparing a part of the first data stored in the first communication device with a part of the second data stored in the second communication device. Alternatively, the monitored item may be a change rate of the error rate. A rate of shared data generation can be used as another monitored item.

As an embodiment of the present invention, when the measured value of the monitored item exceeds a first fault-detection threshold, frame synchronization is performed as the recovery, wherein the frame synchronization is performed by: generating an error rate by comparing a part of the first data stored in the first communication device with a part of the second data stored in the second communication device while changing a bit-to-bit correspondence between the first data and the second data; and searching for a bit-to-bit correspondence which minimizes the error rate or provides an error rate lower than the first fault-detection threshold.

As another embodiment of the present invention, when the measured value of the monitored item is equal to or lower than the first fault-detection threshold and exceeds a second fault-detection threshold, timing correction is performed as the recovery. The timing correction is performed by: generating the error rate while changing the operation timing in at least one of the first communication device and the second communication device; and searching for an operation timing which minimizes the error rate. In this case, it is preferable to further perform the frame synchronization. In the embodiments as described later, "timing correction" means phase correction.

Preferably, shared data generation is stopped when the measured value of the monitored item exceeds a predetermined fault-detection threshold even after the recovery has been repeated consecutively a predetermined number of times. Further, preferably, when the shared data generation is stopped, an alarm is raised to indicate a possibility of eavesdropping.

According to another aspect of the present invention, in a communication system comprising a transmitter and a receiver which are connected through an optical transmission line and communicate with each other through a plurality of communication channels, the transmitter includes: a first memory for storing first data and second data; a first modulator for modulating an optical signal according to the first and second data; a first communication section for transmitting a modulated optical signal to the receiver through a first communication channel; a first transceiver for data communication with the receiver through a second communication channel; and a first controller controlling operation timing of the first modulator. The receiver includes: a second memory for storing third data; a second communication section for receiving an optical signal from the transmitter through the first communication channel; and a second modulator for modulating a received optical signal according to the third data; a photo detector for detecting fourth data based on the received optical signal and an optical output signal of the second modulator; a third memory for storing the fourth data; a second transceiver for data communication with the transmitter through the second communication channel; and a second controller controlling operation timing of the second modulator and the photo detector. In addition, at least one of the transmitter and the receiver is further provided with a third controller which performs: measurement for at least one monitored item based on the first to fourth data; comparing a measured value for each monitored item with at least one fault-detection threshold for the monitored item, to determine whether a corresponding fault occurs; and when it is determined that the corresponding fault occurs, performing recovery of the communication system from the corresponding fault.

The communication system may be of the round-trip transmission type or one-way transmission type. The first controller and the second controller may be synchronized in operation timing according to a reference clock signal.

The third controller may perform: when the measured value of the monitored item exceeds a first fault-detection threshold, provisionally setting an inter-device bit deviation and an intra-device bit deviation, wherein the inter-device bit deviation indicates a deviation of a bit-to-bit correspondence between the first modulator and the photo detector and the intra-device bit deviation indicates a deviation of a bit-to-bit correspondence between the second modulator and the photo detector; comparing the fourth data and the first data with respect to matching bits between the second data and the third data while sequentially changing the inter-device bit deviation and the intra-device bit deviation, wherein the matching bits are obtained by comparing the second data and the third data with respect to bits corresponding to a part of the fourth data; calculating an error rate from a comparison result of the fourth data and the first data with respect to the matching bits; and recovering frame synchronization by determining the inter-device bit deviation and the intra-device bit deviation which minimize the error rate or provides an error rate lower than the first fault-detection threshold.

Preferably, the third controller may perform: provisionally setting an inter-device bit deviation and an intra-device bit deviation when the measured value of the monitored item exceeds a first fault-detection threshold, wherein the inter-device bit deviation indicates a deviation of a bit-to-bi correspondence between the first modulator and the photo detector and the intra-device bit deviation indicates a deviation of a bit-to-bit correspondence between the second modulator and the photo detector; comparing the fourth data and the first data with respect to matching bits between the second data and the third data while sequentially changing the inter-device bit deviation, wherein the matching bits are obtained by comparing the second data and the third data with respect to bits corresponding to a part of the fourth data; calculating a first error rate from a comparison result of the fourth data and the first data with respect to the matching bits; determining the inter-device bit deviation based on the first error rate (e.g. which minimizes the first error rate or which provides the first error rate lower than the first fault-detection threshold); when the measured value of the monitored item is equal to or lower than the first fault-detection threshold and exceeds a second fault-detection threshold, comparing the fourth data and the first data with respect to matching bits between the second data and the third data while sequentially changing the intra-device bit deviation, wherein the matching bits are obtained by comparing the second data and the third data with respect to bits corresponding to a part of the fourth data; calculating a second error rate from a comparison result of the fourth data and the first data with respect to the matching bits; determining the intra-device bit deviation based on the second error rate (e.g. which minimizes the second error rate or which provides the second error rate lower than the second fault-detection threshold); and recovering frame synchronization using the determined inter-device bit deviation and the determined intra-device bit deviation.

The third controller may perform timing correction as the recovery when the measured value of the monitored item is equal to or lower than the second fault-detection threshold and exceeds a third fault-detection threshold, wherein the timing correction is performed by: generating the error rate while changing the operation timing in at least one of the first controller and the second controller; and searching for an operation timing which minimizes the error rate.

According to the present invention, at least one monitored item and its fault-detection threshold value are preset. A fault is identified based on a measurement value for the monitored item and its fault-detection threshold value, and individual recovery is performed depending on the identified fault. Accordingly, recovery processing appropriate to the fault factor can be performed. It is possible to efficiently avoid stopping the process of key generation as a result of treating all fault factors alike as in the cases of conventional technologies. This makes it possible that the process of key generation is continued by performing recovery processing appropriate to a fault for which the key generation process does not need to be stopped. Accordingly, as a whole, the efficient process can be performed.

Moreover, a fault factor is identified with the consideration of not only a processing timing deviation between the sender and receiver but also a processing timing deviation occurring inside the receiver, whereby appropriate recovery processing can be performed. Accordingly, it is possible to achieve a stable and highly reliable communication system.

In the case of applying the present invention to a quantum key distribution system in particular, a cryptographic key can be stably generated. According to conventional quantum key distribution technologies, degradation in the error rate (QBER) means the presence of an eavesdropper. However, according to the present invention, before the generation of a cryptographic key is stopped, various types of recovery processing can be performed depending on the contents of a fault, which can eliminate the cases where deterioration in the error rate due to an environmental change, a communication error or the like is misidentified as the presence of an act of eavesdropping. Consequently, even if a fault occurs, which should have caused the key generation to be stopped in a conventional case, the cryptographic key generation can be resumed. Accordingly, it is possible to achieve stable operation for cryptographic key generation over a long time. Moreover, with a plurality of monitored items and their fault-detection threshold values, fault factors can be handled separately, and individual recovery processing can be performed depending on each fault factor. As a result, it is possible to reduce the length of time required for recovery processing and to increase accordingly the time proportion that can be allotted for the cryptographic key generation.

BRIEF DESCRIPTION OF THE DRAWINGS

FIG. 6 is a schematic diagram showing that bit numbers deviate due to propagation delay between devices and propagation delay inside a device, in a quantum key distribution system.

FIG. 10 is a sequence diagram showing a process of frame synchronization processing to be performed between a sender and a receiver.

FIG. 14A is a diagram describing the case where alternative-shift phase modulation exhibits a suitable effect in an optical system in the quantum key distribution system shown in FIG. 4.

FIG. 14B is a diagram describing the case where the alternative-shift phase modulation does not exhibit a suitable effect.

FIG. 15 is a flowchart showing a method for controlling a communication network according to a modification example of the second embodiment of the present invention.

DETAILED DESCRIPTION OF THE PREFERRED EMBODIMENTS

Hereinafter, a quantum key distribution system will be described as a preferred mode of the present invention, although the present invention has a wide range of applications to communication systems that require operation timing synchronization and/or data synchronization between a sender and a receiver. In particular, a plug and play scheme is considered as a promising scheme to put polarization-sensitive quantum key distribution systems into practical use, because this scheme can compensate for polarization fluctuations occurring along an optical fiber transmission line (see G. Ribordy, "Automated 'plug & play' quantum key distribution," Electronics Letters, Vol. 34, No. 22, pp. 2116 to 2117 (hereinafter, this document will be referred to as Ribordy), and W. Maeda, "High-Speed QKD system synchronized by Automatic Phase-Alignment Mechanism," OFC2005, OWI4 (hereinafter, this document will be referred to as Maeda)).

1. System Configuration

Figure 4:
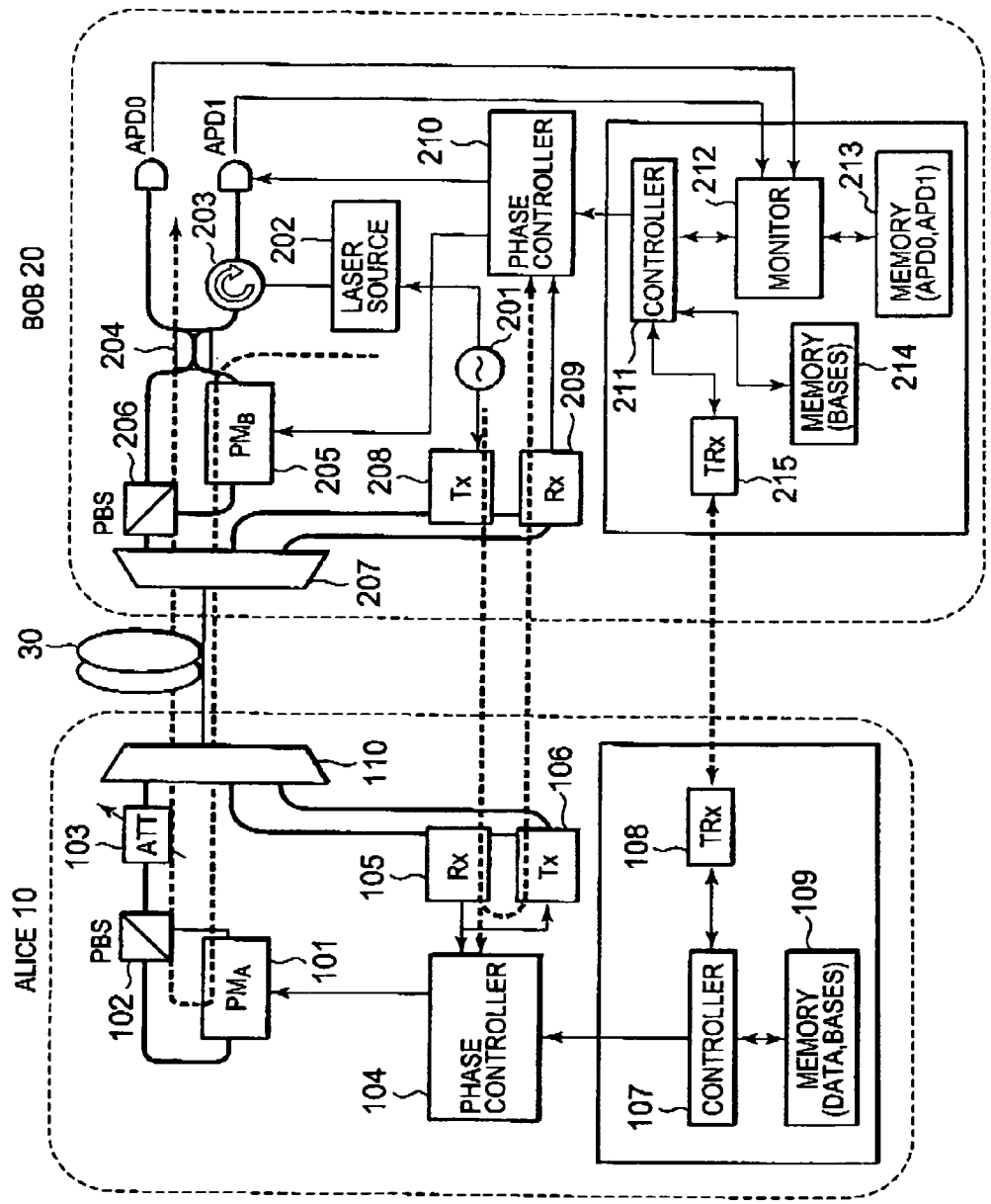
FIG. 4 is a block diagram showing a configuration of a plug and play quantum key distribution system according to a first mode of the present invention.

FIG. 4 is a block diagram showing a configuration of a plug and play quantum key distribution system according to a first mode of the present invention. In the quantum key distribution system according to this mode, a sender/transmitter (Alice) 10 and a receiver (Bob) 20 are optically connected through an optical fiber transmission line 30.

1.1) Sender (Alice)

A quantum unit in the sender 10 has a variable optical attenuator 103 and a PBS loop including a phase modulator 101 and a polarization beam splitter (PBS) 102. The phase modulator 101 performs phase modulation on a sequence of optical pulses passing through it, in accordance with phase control signals supplied from a phase controller 104. The depths of phase modulation include four depths (0, $\pi/2$, $\pi$, $3\pi/2$) corresponding to four combinations of a random number representing a basis (+/×), and a random number (0/1) representing source data of a key. A phase control signal is a voltage corresponding to any one of the modulation depths. The phase control signal is applied to the phase modulator 101 at the timing when an optical pulse is passing through the phase modulator 101, and thus the optical pulse is phase-modulated. The phase controller 104 applies the phase control signal to the phase modulator 101 in accordance with a synchronization clock received from an optical receiver 105, and this application timing and the applied voltage are controlled by a controller 107, which will be discussed later.

The PBS loop has a function similar to a faraday mirror. Light input to the PBS 102 from the receiver side is output with its polarization state rotated by 90 degrees (for details, see the specification of Japanese Patent Application No. 2004-335228 filed on Nov. 19, 2006 by the present applicant, and A. Tanaka, "Temperature independent QKD system using alternative-shifted phase modulation method," ECOC2004, Tu4.5.3 (hereinafter, this document will be referred to as Tanaka)). An optical signal input to the quantum unit from the receiver 20 is passed through the variable optical attenuator 103, turned around at the PBS loop as described above, passed through the variable optical attenuator 103 again, and then sent back to the receiver 20. The variable optical attenuator 103 is set at a small amount of attenuation in a training mode for synchronization between quantum units, and is set at a large amount of attenuation to accomplish single-photon transmission in a quantum mode for key generation.

Moreover, the sender 10 has two random number generators (not shown). The controller 107 causes one of the random number generators to generate the source data (0/1) for a cryptographic key and the other to generate the basis information (+/×), and sequentially stores the generated source data and basis information in a memory 109. The bit number of each of the stored random numbers is managed by using an address in the memory 109, which will be discussed later. For the memory 109, it is preferable to use a memory that can achieve fast access. Here, SDRAM (Synchronous DRAM) is used.

When a key generation flow is started, the controller 107 allows the variable optical attenuator 103 to increase the amount of attenuation. Then, the controller 107 sequentially reads the sets of source data and basis information from the memory 109 one by one and outputs them to the phase controller 104. The phase controller 104 outputs a phase control signal corresponding to each set of source data and basis information to the phase modulator 101 in accordance with the synchronization clock, whereby a modulation at any one of the four depths (0, $\pi/2$, $\pi$, $3\pi/2$) is performed on each of optical pulses passing through the phase modulator 101.

For the synchronization clock supplied to the phase controller 104, a reference clock received from the receiver 20 through the optical fiber transmission line 30 is used. The reference clock is converted into an electric signal by the optical receiver 105 and output to the phase controller 104. At the same time, this reference clock is also output to an optical transmitter 106 and returned to the receiver 20 as a reference clock. Additionally, the controller 107 exchanges control signals and data required for key generation, synchronization processing, correction processing and the like, with a controller 211 in the receiver 20 via an optical transceiver 108.

Wavelength division multiplexing transmission is used in the present mode. Different wavelengths are used for the quantum-unit communications, reference-clock exchanges, and data communications by the controller 107, respectively. The sender 10 is provided with a wavelength multiplexer/demultiplexer 110, which demultiplexes the wavelengths of optical signals input from the optical fiber transmission line 30 and outputs the respective optical signals to the variable optical attenuator 103, optical receiver 105 and optical transceiver 108. Reversely, the wavelength multiplexer/demultiplexer 110 multiplexes the wavelengths of respective optical signals output from the variable optical attenuator 103, optical receiver 105 and optical transceiver 108 and sends the optical signals out to the optical fiber transmission line 30. That is, a quantum channel used by the quantum unit and classical channels respectively used by the optical receiver 105, optical transmitter 106 and optical transceiver 108 are wavelength-multiplexed over the optical fiber transmission line 30.

1.2) Receiver (Bob)

A quantum unit in the receiver 20 according to the present mode has an optical circulator 203, an optical coupler 204, a phase modulator 205, a PBS 206, and photo detectors APD0 and APD1. A long path and a short path are provided in parallel between the optical coupler 204 and PBS 206. The phase modulator 205 is placed in the long path, and its driving timing and the depth of phase modulation (basis) are controlled with a phase control signal from a phase controller 210. The photo detectors APD0 and APD1 are avalanche photodiodes (APD) and are driven in the gated Geiger mode in accordance with a control signal from the phase modulator 210 (see A. Tomita, "Balanced, gated-mode photon detector for quantum-bit discrimination at 1550 nm," Optics letters, vol. 27 (2002), pp. 1827 to 1829 (hereinafter, this document will be referred to as Tomita)).

The receiver 20 is provided with a reference-clock source 201. A laser source 202 is driven in accordance with a reference clock generated by the reference-clock source 201, and at the same time, this reference clock is transmitted to the sender 10 via an optical transceiver 208. In the sender 10, the reference clock is used to determine the synchronization timing on one hand and is sent back to the receiver 20 as it is on the other hand. The reference clock returned from the sender 10 is received by an optical receiver 209 and supplied to the phase controller 210 as a synchronization clock for the receiver 20. Under control of the controller 211, the phase controller 210 controls the timing of applying voltage to the phase modulator 205, as well as the depth of phase modulation on the phase modulator 205, so that the timing is synchronized with the supplied reference clock. Moreover, the phase controller 210 controls the timing of applying reverse-bias voltage for photon detection to the photo detectors APD0 and APD1.

Further, the receiver 20 has a random number generator (not shown). The controller 211 causes the random number generator to generate basis information (+/×) and sequentially stores it in a memory 214. When a key generation flow is started, the controller 211 sequentially reads the basis information from the memory 214 and outputs it to the phase controller 210. For the memory 214, a memory that can achieve fast access (here, SDRAM) is used. The phase controller 210 applies a phase control signal at a voltage corresponding to the read basis information to the phase modulator 205 in accordance with the reference clock. Thus, a modulation corresponding to the read basis information can be performed on an optical pulse sent from the sender 10 at the timing when the optical pulse is passing through the phase modulator 205.

An optical pulse modulated by the phase modulator 101 in the sender 10 and an optical pulse modulated by the phase modulator 205 in the receiver 20 are made to interfere at the optical coupler 204, and a photon is detected by the photo detector APD0 or APD1, depending on the difference between the respective depths of phase modulation. Detection signals from the photo detectors APD0 and APD1 are sequentially written in a memory 213 as a raw key. Incidentally, the bit number of each data of the raw key written in the memory 213 and the bit number of each random number as basis information stored in the memory 214 are each managed by using an address in the respective memories, which will be discussed later. For the memory 213, a SDRAM that can achieve fast access is used here.

Subsequently, the bit numbers for the raw key stored in the memory 213 and the corresponding basis information stored in the memory 214 are notified to the controller 107 in the sender 10, and basis reconciliation is carried out as described above to discard those random-number bits corresponding to non-matching bases. In this event, as to those bits corresponding to matching bases, it is also detected whether or not the detection data stored in the memory 213 match the source data stored in the memory 109, and the error rate QBER is calculated. A monitor 212 always monitors a change in QBER while storing the calculated error rate QBER in the memory 213. Depending on the value of the error rate QBER or the amount of change in QBER, the controller 211 appropriately carries out the undermentioned phase correction processing or frame synchronization processing.

As described above, wavelength division multiplexing transmission is used in the present mode, and different wavelengths are used for the quantum-unit communications, reference-clock exchanges, and data communications such as basis reconciliation by the controller 211, respectively. The receiver 20 is provided with a wavelength multiplexer/demultiplexer 207, which demultiplexes the wavelengths of optical signals input from the optical fiber transmission line 30 and outputs the respective optical signals to the PBS 206, optical receiver 209 and optical transceiver 215. Reversely, the wavelength multiplexer/demultiplexer 207 multiplexes the wavelengths of respective optical signals output from the PBS 206, optical transmitter 208 and optical transceiver 215 and sends the optical signals out to the optical fiber transmission line 30.

2. System Operation

An optical pulse P output from the laser source 202 in accordance with the clock signal supplied from the reference-clock source 201 is led into the optical coupler 204 by the optical circulator 203 and split into two parts at the optical coupler 204. One of the two parts, an optical pulse P1, is allowed along the short path and directly sent to the PBS 206, whereas the other, an optical pulse P2, is passed through the phase modulator 205 placed in the long path and then sent to the PBS 206. These optical pulses P1 and P2 are combined at the PBS 206 and transmitted to the sender 10 as double pulses after passing through the wavelength multiplexer/demultiplexer 207 and optical transmission line 30.

In the sender 10, each of the double pulses P1 and P2 arriving after passing through the optical transmission line 30, wavelength multiplexer/demultiplexer 110 and variable optical attenuator 103 is further split into two parts at the PBS 102, resulting in four pulses (i.e., quartet pulses) including clockwise double pulses $P1_{CW}$ and $P2_{CW}$ and counterclockwise double pulses $P1_{CCW}$ and $P2_{CCW}$. Each pair passes through the phase modulator 101 in the direction opposite to the other pair and enters a PBS port that is different from a port from which it was output.

The phase modulator 101 performs phase modulation on the pulse $P2_{CW}$, the following one of the clockwise double pulses $P1_{CW}$ and $P2_{CW}$, with respect to the preceding pulse $P1_{CW}$, and also gives a phase difference of $\pi$ between the clockwise double pulses and the counterclockwise double pulses. The phase modulator 101 is timing-controlled so as to perform an arbitrary phase modulation on each of the quartet pulses in accordance with phase control signals from the phase controller 104.

The quartet pulses thus phase-modulated as required are combined at the PBS 103, returning to double pulses again. The output double pulses are denoted by P1 and $P2^{*a}$ because, as described above, only the following pulse of the clockwise double pulses is phase-modulated based on the transmission information. At this point, when each pulse is output, the polarization is rotated by 90 degrees with respect to the polarization when it was input. Consequently, an effect similar to the faraday mirror can be obtained.

In the receiver 20, since the polarization states of the optical pulses P1 and $P2^{*a}$ received from the sender 10 each have been rotated by 90 degrees, the PBS 206 leads each of these received pulses to a path different from the path the pulse used when it was transmitted. Specifically, the received optical pulse P1 goes along the long path and is phase-modulated with a designated basis at the timing when it is passing through the phase modulator 205, resulting in a phase-modulated optical pulse $P1^{*b}$, which arrives at the optical coupler 204. On the other hand, the optical pulse $P2^{*a}$ travels along the short path that is different from the path it used at the time of transmission from the receiver 20, and arrives at the same optical coupler 204.

In this manner, the optical pulse $P2^{*a}$ phase-modulated in the sender 10 and the optical pulse $P1^{*b}$ phase-modulated in the receiver 20 are made to interfere with each other, and the result of this interference is detected by the photon detector APD0 or APD1. The photon detectors APD0 and APD1 are driven in the gated Geiger mode in accordance with the clock signal supplied from the phase controller 210. Detection data obtained by the photon detectors APD0 and APD1 are sequentially stored in the memory 213. The monitor 212 monitors QBER calculated at the time of basis reconciliation. The controller 211 compares the error rate QBER with threshold values ($Q_{bit}$, $Q_{phase}$, etc.) corresponding to monitored items, stored in advance and, when necessary, carries out recovery processing appropriate to each monitored item. Hereinafter, detailed description will be given of supervisory control and recovery processing according to preferred embodiments of the present invention. The supervisory control and recovery processing according to these embodiments are carried out by the controller 107 in the sender 10, and the controller 211 and monitor 212 in the receiver 20. However, similar functions may be implemented by executing a frame synchronization control program on respective program-controlled processors of the sender 10 and the receiver 20.

3. First Embodiment

First, in a first embodiment, the following four points are assumed as factors for system faults in a quantum key distribution system.

(1) Frame synchronization deviation: deviation in frame synchronization between Alice and Bob or deviation in frame synchronization inside Bob.

(2) Modulation/detection phase deviation: deviation of a clock phase for photon-pulse modulation and/or deviation of a clock phase for photon-pulse detection.

(3) Presence of an eavesdropper (Eve): deterioration in the rate of cryptographic key generation due to an act of eavesdropping.

(4) Light source/photo detector fault: fault of a device for generating photon pulses and/or fault of a device for detecting photon pulses.

Although the details of these faults will be described later, it can be seen that different types of faults cause different levels of deterioration in the error rate QBER. Therefore, in the present embodiment, a threshold value $Q_{bit}$ for frame synchronization processing, a threshold value $Q_{phase}$ for phase correction processing, and a threshold value $Q_{Eve}$ for eavesdropping detection are preset, corresponding to the types of faults. Specific methods of determining these threshold values will be discussed later in the detailed description of each of the faults.

Figure 5A:
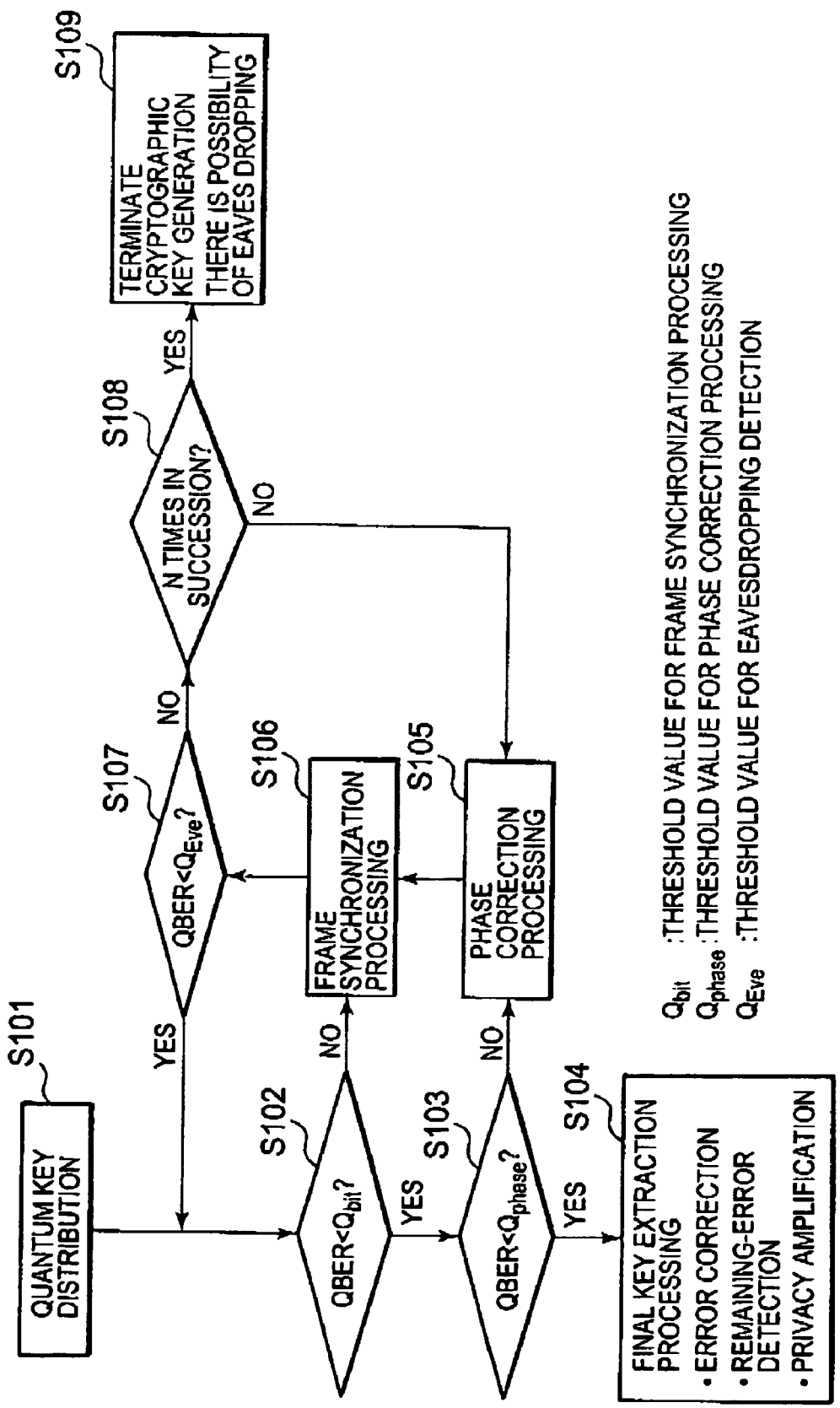
FIG. 5A is a flowchart showing a method for controlling a communication network according to a first embodiment of the present invention.
Figure 5B:
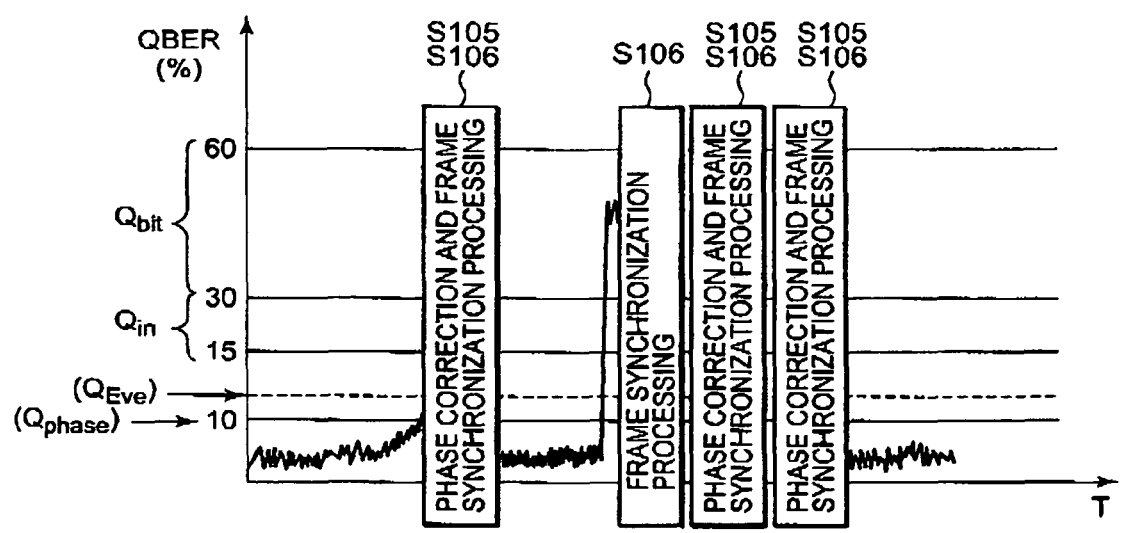
FIG. 5B is a graph schematically showing an example of phase correction processing and frame synchronization processing performed in accordance with change in the error rate QBER.

FIG. 5A is a flowchart showing a method for controlling a communication network according to the first embodiment of the present invention, and FIG. 5B is a graph schematically showing an example of the phase correction processing and frame synchronization processing performed in accordance with change in the error rate QBER. In the present embodiment, detection of a system fault and work of system recovery are performed based on the sequence shown in FIG. 5A.

As described above, the monitor 212 monitors QBER calculated in a step of quantum key distribution S101, and the controller 211 compares QBER with the threshold value $Q_{bit}$ for frame synchronization processing (S102). When QBER<$Q_{bit}$, the controller 211 further compares QBER with the threshold value $Q_{phase}$ for phase correction processing (S103). When QBER<$Q_{phase}$ (S103: Yes), each processing in the subsequent flow of key generation, including error correction, remaining-error detection and privacy amplification here, is carried out (S104).

On the other hand, in the case where although QBER<$Q_{bit}$ (S102: Yes), QBER is deteriorated more than the threshold value $Q_{phase}$ for phase correction processing (S103: No), then phase correction processing is carried out (S105). As defined already, "phase deviation" refers to a deviation of the clock timing from the timing of the passage/arrival of a photon. For the "phase correction processing," a method using phase alignment described in Maeda may be employed. Alternatively, other methods may be employed, such as sequentially shifting the clock timing by controlling the phase controller, thereby setting the clock timing, by using the monitor 212, at the position that minimizes QBER.

When the phase correction processing S105 has finished, frame synchronization processing is next carried out (S106). As defined already, "frame synchronization" refers to a state where information-bit synchronization is established between the sender and receiver, that is, a state where correct recognition of a bit-to-bit correspondence is established between the sender and receiver. "Frame synchronization deviation" refers to a state where the bit-to-bit correspondence is incorrectly recognized. Moreover, "frame synchronization processing" refers to the processing of resetting the bit-to-bit correspondence at the position that minimizes QBER by sequentially shifting the bit-to-bit correspondence. More specific description thereof will be given in the paragraph on the frame synchronization processing below.

When the frame synchronization processing S106 has finished, the controller 211 compares QBER recalculated with the threshold value $Q_{Eve}$ for eavesdropping detection (S107). When QBER<$Q_{Eve}$ (S107: Yes), the process returns to the step S102 again.

On the other hand, if QBER is deteriorated more than the threshold value $Q_{bit}$ for frame synchronization processing (S102: No), the above-described frame synchronization processing (S106) is carried out, and subsequently the step S107 is carried out.

Here, the reason why the frame synchronization processing S106 is carried out after the phase correction processing S105, is that there is a possibility that the clock phase is changed by the phase correction processing, which might induce a frame synchronization deviation. Moreover, in making a comparison between the frame synchronization processing and the phase correction processing, the length of time required for the frame synchronization processing is far shorter than that required for the phase correction processing in general. Therefore, the loss of time is not very great if, upon the phase correction processing, the frame synchronization processing is performed supplementally.

In the step S107, if QBER is deteriorated more than $Q_{Eve}$ (S107: No), the controller 211 continuously repeats the phase correction processing S105 and frame synchronization processing S106 for a predetermined number (N) of times until QBER<$Q_{Eve}$ (S108). If QBER is not improved even after these processing steps are repeated N times (S108: Yes), then, but not till then, the cryptographic key generation flow is stopped (S109). At this time, it is preferable to generate an alarm indicating a possibility of eavesdropping.

Incidentally, QBER is a value probabilistically determined and has a finite deviation. Accordingly, a fault is determined not only in such a manner that the threshold values $Q_{bit}$ and $Q_{phase}$ for comparison with QBER are set and "a fault is acknowledged when QBER exceeds the threshold values," but also needs to be determined in such a manner that "a fault is acknowledged when QBER exceeds the threshold values a plurality of times consecutively."

Although QBER is deteriorated also when information is leaked due to an act of eavesdropping during quantum key distribution, this deterioration will not be improved by system recovery. Therefore, in the case where the system is not recovered even after the phase correction processing S105 and frame synchronization processing S106 are repeated a predetermined number of times consecutively, it is determined that there is a possibility of eavesdropping, and the cryptographic key generation is stopped. At this time, it is preferable to generate an alarm indicating a possibility of eavesdropping.

Even in this case, it is possible to generate a cryptographic key, by discarding as much information as might be leaked, using the means of estimating the amount of leaked information shown in Lutkenhaus and Williamson. However, secure cryptographic key generation cannot be performed when the error rate exceeds a certain value. Therefore, this value is used as the threshold value $Q_{Eve}$ for eavesdropping detection.

In addition, there are some occasions where the error rate is increased due to a fault of a device itself used in a system. However, since the ultimate object of the present system is to generate a shared cryptographic key without leakage to a third party, the faults that do not affect QBER can be ignored. Therefore, it may be acceptable that the stopping of cryptographic key generation is triggered when QBER exceeds the threshold value $Q_{Eve}$ even after system recovery.

FIG. 5B schematically shows change in QBER, as well as the phase correction processing S105 and frame synchronization processing S106, when, as an example, $Q_{bit}$=30%, $Q_{phase}$=10%, and $Q_{Eve}$=10% plus. As shown in FIG. 5B, even when QBER is deteriorated, it is checked whether or not a recovery can be made by carrying out the phase correction processing S105 and frame synchronization processing S106. If the system is recovered, the key generation flow can be continued without being stopped, which can improve the efficiency in key generation. Moreover, when the system cannot be recovered even after the phase correction processing S105 and frame synchronization processing S106 are repeated several times, it is determined that "there is a possibility of eavesdropping," and the cryptographic key generation is stopped. Therefore, security can be ensured as well as the efficiency in key generation.

3.1) Frame Synchronization Deviation

As mentioned already, in a quantum key distribution system, it is a precondition that the frame synchronization of information bits is established between the sender and receiver, that is, correct recognition of a bit-to-bit correspondence is established between the sender and receiver. However, as a realistic problem, there is a possibility that a loss of bit-position synchronization occurs due to the extension/contraction of an optical transmission line caused by change in temperature, delay variation among the electric circuits in a receiver, and the like.

3.1.1) Definition of Inter-device/Intra-device Processing Deviation

FIG. 6 is a schematic diagram showing that bit numbers deviate due to propagation delay between the devices (inter-device propagation delay) and due to propagation delay inside a device (intra-device propagation delay), in a quantum key distribution system. As mentioned above, the bit numbers of data and the bit numbers of bases are managed by using the addresses in the memories.

In the memory 109 of the sender 10, the random numbers corresponding to the source data for a cryptographic key are respectively stored at addresses ( . . . i−3, i−2, i−1, i, i+1, . . . ), and the random numbers corresponding to the basis information are respectively stored at addresses ( . . . j−3, j−2, j−1, j, j+1, . . . ). Here, it is assumed that i and j correspond to each other. When modulation is performed by the phase modulator 101, the controller 107 reads a random number (source data) and a basis from respective addresses i and j in the memory 109, and the phase modulator 101 phase-modulates an optical pulse at the modulation depth corresponding to the combination of the source data and the basis. However, it is assumed that there is no delay difference between reading from the addresses i and reading from the addresses j, by virtue of a delay equalizing design for the inside of the device, so that it is always satisfied that i=j.

In the receiver 20, each of the double pulses sent from the sender 10 is led by the PBS 206 to a path different from the path it used when it was transmitted from the receiver 20, as described above. One of the double pulses goes along the short path and arrives at the optical coupler 204 as it is, whereas the other pulse goes along the long path and arrives at the optical coupler 204 after phase-modulated by the phase modulator 205. When the phase modulator 205 performs phase modulation, the controller 211 reads a basis from an address (k) in the memory 214, and the phase modulator 205 phase-modulates the optical pulse at the modulation depth corresponding to this basis.

Data detected by the photo detectors APD0 and APD1 are sequentially written at addresses l and m in the memory 213, respectively. In this case as well, it is assumed that there is no delay difference between writing into the addresses l and writing into the addresses m, by virtue of the delay equalizing design for the inside of the device, so that it is always satisfied that l=m.

As described above, the read addresses i and j in the memory 109 of the sender 10, the read addresses k in the memory 214 of the receiver 20, and the write addresses l and m in the memory 213 of the receiver 20 all have different values from each other. To correctly identify which bit on the sender side corresponds to which bits on the receiver side, it is necessary to determine address-to-address correspondences among these memories in advance.

Here, assuming that it is always satisfied that i=j and l=m, the difference between a modulation address (i) in the memory 109 of the sender 10 and a detection address (l) in the memory 213 of the receiver 20 will be referred to as an inter-device address difference $G_D$ (=l−i) or an inter-device address/bit deviation, and the difference between a modulation address (k) and a detection address (l) inside the receiver 20 will be referred to as an intra-device address difference $G_I$ (=l−k) or an intra-device address/bit deviation. The relationship between variation in the values of these address differences and degradation in the communication quality will be considered below.

3.1.2) Frame Sync Deviation and QBER Deterioration

When the inter-device address deviation $G_D$ and/or intra-device address deviation $G_I$ fluctuate due to change in temperature and the like, QBER varies as follows. Note that, for simplicity, it is assumed that all the bits transmitted from Alice arrive at Bob.

a) Where $G_D$ and $G_I$ are both correct

Figure 7:
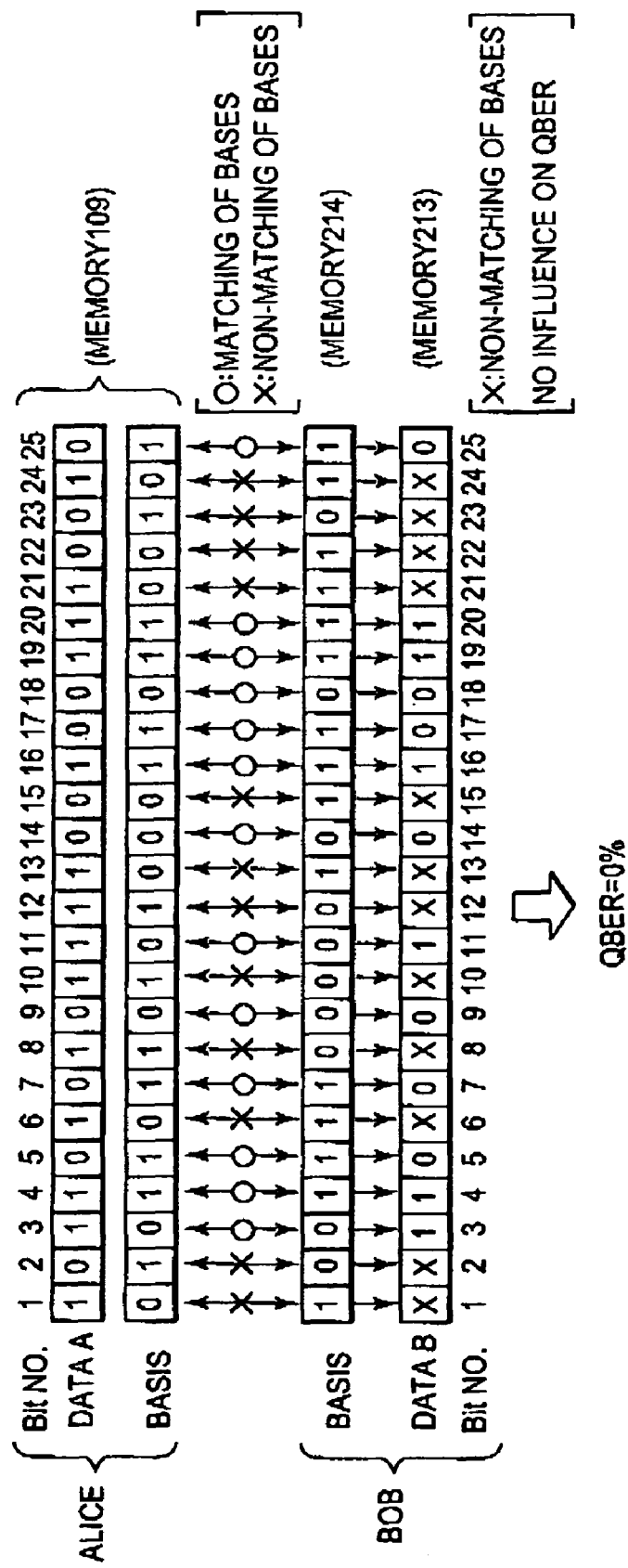
FIG. 7 is a schematic diagram showing a bit-to-bit correspondence in the case where an address difference between devices (inter-device address difference) $G_D$ and an address difference inside a device (intra-device address difference) $G_I$ are both correct.

FIG. 7 is a schematic diagram showing a bit-to-bit correspondence in the case where the inter-device address difference $G_D$ and intra-device address difference $G_I$ are both correct. In the calculation of QBER, the rate of data matching is calculated only as to those bits corresponding to the matching bases used for modulation at Alice and Bob. As shown in FIG. 7, those bits corresponding to the non-matching bases are not involved with the error rate. As for the bits corresponding to the matching bases, the data A on the Alice's side match the data B on the Bob's side, and therefore QBER is 0%.

b) Where $Q_D$ is incorrect

Figure 8:
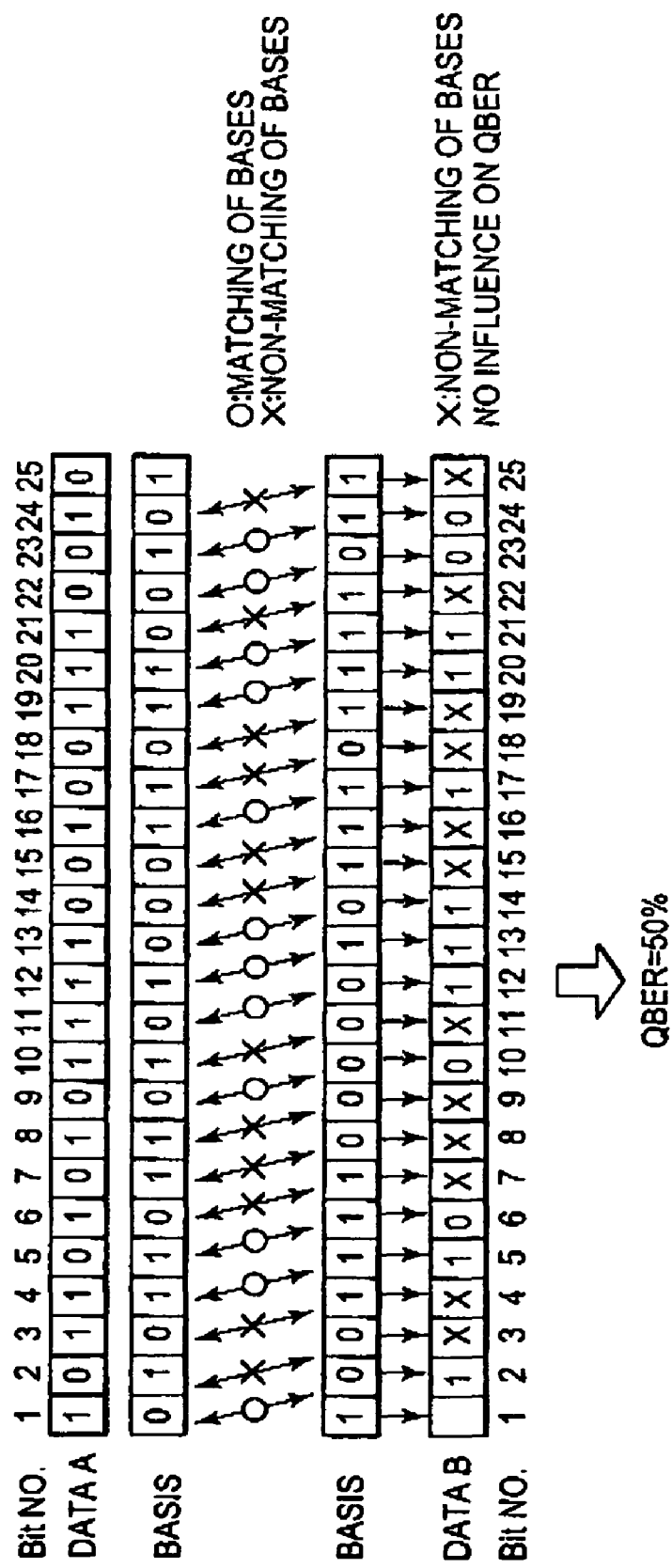
FIG. 8 is a schematic diagram showing a bit-to-bit correspondence in the case where the inter-device address difference $G_D$ is incorrect.

FIG. 8 is a schematic diagram showing a bit-to-bit correspondence in the case where the inter-device address difference is incorrect. In this case, when basis reconciliation is performed, the bits to be compared are wrong ones. Accordingly, comparison is carried out between the deviated, uncorrelated random numbers, with the result that QBER is approximately 50%. However, depending on the number of bits involved with the calculation of QBER, a frame synchronization deviation might occur within the calculation range, or the result of calculation itself might have variations and the like. With consideration given to these points, if the result of QBER calculation falls within the range of approximately 30% to 60%, it can be determined that a frame synchronization deviation in the case of incorrect $G_D$ has occurred. Therefore, as a reference to determine this frame synchronization deviation attributable to incorrect $G_D$, a threshold value $Q_{bit}$ for an inter-device frame synchronization deviation is set within the range of 30% to 60%.

c) Where $G_I$ is incorrect

Figure 9A:
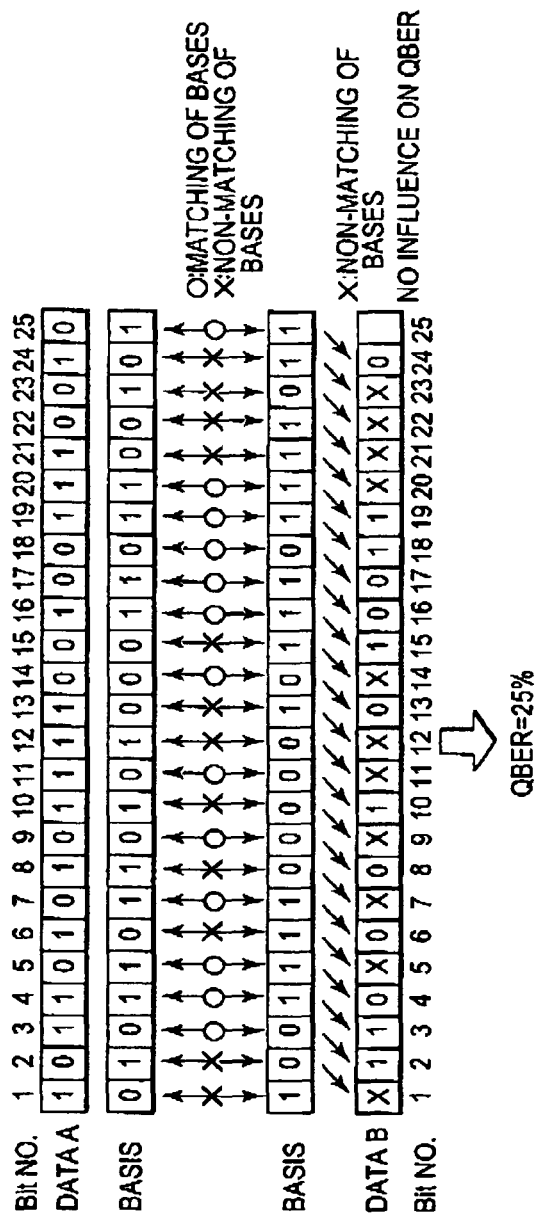
FIG. 9A is a schematic diagram showing a bit-to-bit correspondence in the case where the intra-device address difference $G_I$ is incorrect.
Figure 9B:
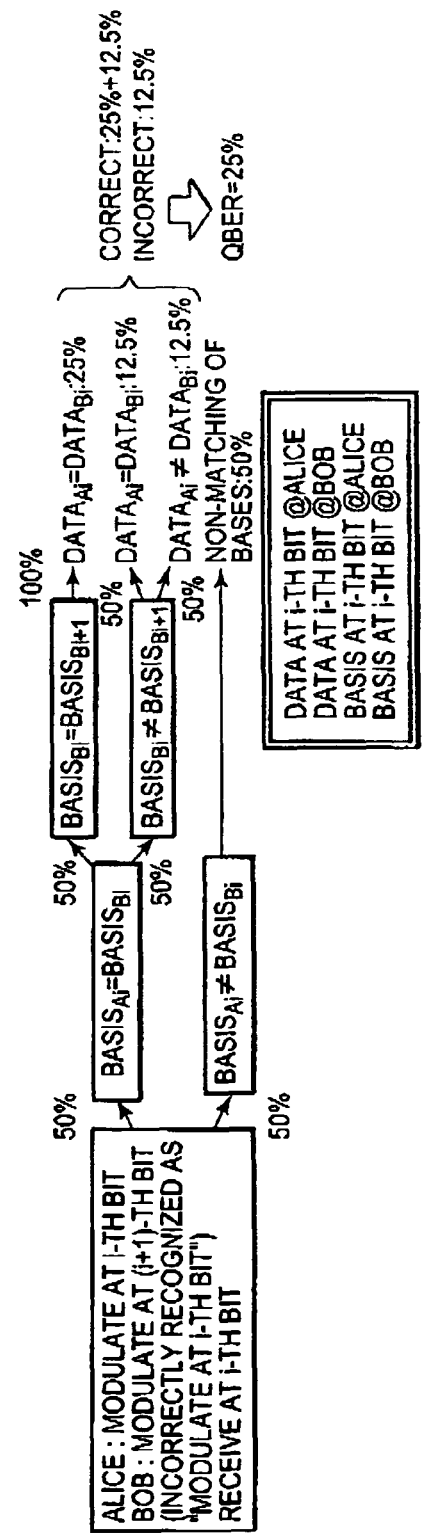
FIG. 9B is a diagram for describing estimated ranges of QBER in this case.

FIG. 9A is a schematic diagram showing a bit-to-bit correspondence in the case where the intra-device address difference $G_I$ is incorrect, and FIG. 9B is a diagram for describing estimated ranges of QBER in this case. As shown in FIG. 9A, in this case, inside Bob, the write addresses of the detection signals deviate from the addresses of the basis information used for modulation at Bob. Therefore, the calculation of QBER is not as simple as the above-described cases (a) and (b) and needs to be considered in separate cases as shown in FIG. 9B.

First, it is assumed that a photon modulated in Alice at the i-th bit is modulated in Bob at the (i+1)-th bit and received at the i-th bit. However, Bob incorrectly recognizes that the photon is modulated in itself at the i-th bit.

The probability that a match occurs between $Basis_{Ai}$ at the i-th bit in Alice and $Basis_{Bi}$ at the i-th bit in Bob and the probability that no match occurs are both 50%. However, since QBER is not affected when the bases at the i-th bit do not match ($Basis_{Ai} \neq Basis_{Bi}$), it is sufficient to consider only the case where a match occurs ($Basis_{Ai} = Basis_{Bi}$).

As mentioned above, in Bob, it is the basis at the (i+1)-th bit that was actually used to modulate the photon. Accordingly, when $Basis_{Bi+1}$ at the (i+1)-th bit is the same as $Basis_{Bi}$ at the i-th bit ($Basis_{Bi} = Basis_{Bi+1}$), the photon can be received without an error (100%). When these bases are different ($Basis_{Bi} \neq Basis_{Bi+1}$), the photon is incorrectly received with a probability of 50%.

Accordingly, the probability that a bit results in an error is 25% (=50% * 50%). Depending on the number of bits involved with the calculation of QBER, a frame synchronization deviation might occur within the calculation range, or the result of calculation itself might have variations and the like. With consideration given to these points, if the result of QBER calculation falls within the range of approximately 15% to 30%, it can be determined that a frame synchronization deviation in the case of incorrect $G_I$ has occurred. Therefore, as a reference to determine this frame synchronization deviation attributable to incorrect $G_I$, a threshold value $Q_{in}$ for an intra-device frame synchronization deviation is set within the range of 15% to 30%.

A frame synchronization deviation in each of the above-described cases is caused by an error in processing by CPU, an error in communications between Alice and Bob, and the like. However, QBER can be restored to the value before deterioration by performing frame synchronization processing described below.

3.1.3) Frame Synchronization Processing

Hereinafter, the frame synchronization processing according to the present embodiment will be described in detail.

a) Frame synchronization processing (1)

FIG. 10 is a sequence diagram showing a process of a first example of the frame synchronization processing performed between the sender and receiver. First, the controller 211 in the receiver (Bob) 20 provisionally sets $G_I'$ as an approximate value of the intra-device address difference $G_I$. Then, when a photon is detected at the timing corresponding to an address l or m in the memory 213 (hereinafter, this timing will be referred to as "l-th bit"), the controller 211 transmits to the sender 10 the detection data (0/1) at the address in question and the bases stored in a predetermined range of (l−$G_I'$) to (l−$G_I'$+gi) around the corresponding address (k) in the memory 214. Here, "gi" represents an adjustment range of the intra-device address difference $G_I$.

The controller 107 in the sender (Alice) 10 provisionally sets $G_D'$ as an approximate value of the inter-device address difference $G_D$. Each combination of the detection data at the l-th bit and the bases (Bob) at the (l−$G_I'$)-th to (l−$G_I'$+gi)-th bits, received from the receiver 20, is checked against each data and basis (Alice) stored in a predetermined range of (l−$G_D'$) to (l−$G_D'$+gd) around the corresponding (l−$G_D'$)-th bit in the memory 109, to calculate QBER each time. Here, "gd" represents an adjustment range of the inter-device address difference $G_D$. In this manner, the values for $G_D$ and $D_I$ that minimize QBER are determined. After the frame synchronization is thus established, cryptographic key extraction is performed by using these determined difference values ($G_D$ and $D_I$).

Here, the error rate QBER can be calculated as follows. Each of the bases (Alice) at the (l−$G_D'$)-th to (l−$G_D'$+gd)-th bits is checked against each of the bases (Bob) at the (l−$G_1'$)-th to (l−$G_I'$+gi)-th bits, and as to each bit corresponding matching bases, the rate of data matching between the corresponding source data stored in the memory 109 on the Alice's side and the detection data at the l-th bit on the Bob's side, is calculated as QBER.

b) Frame synchronization processing (2)

Figure 11:
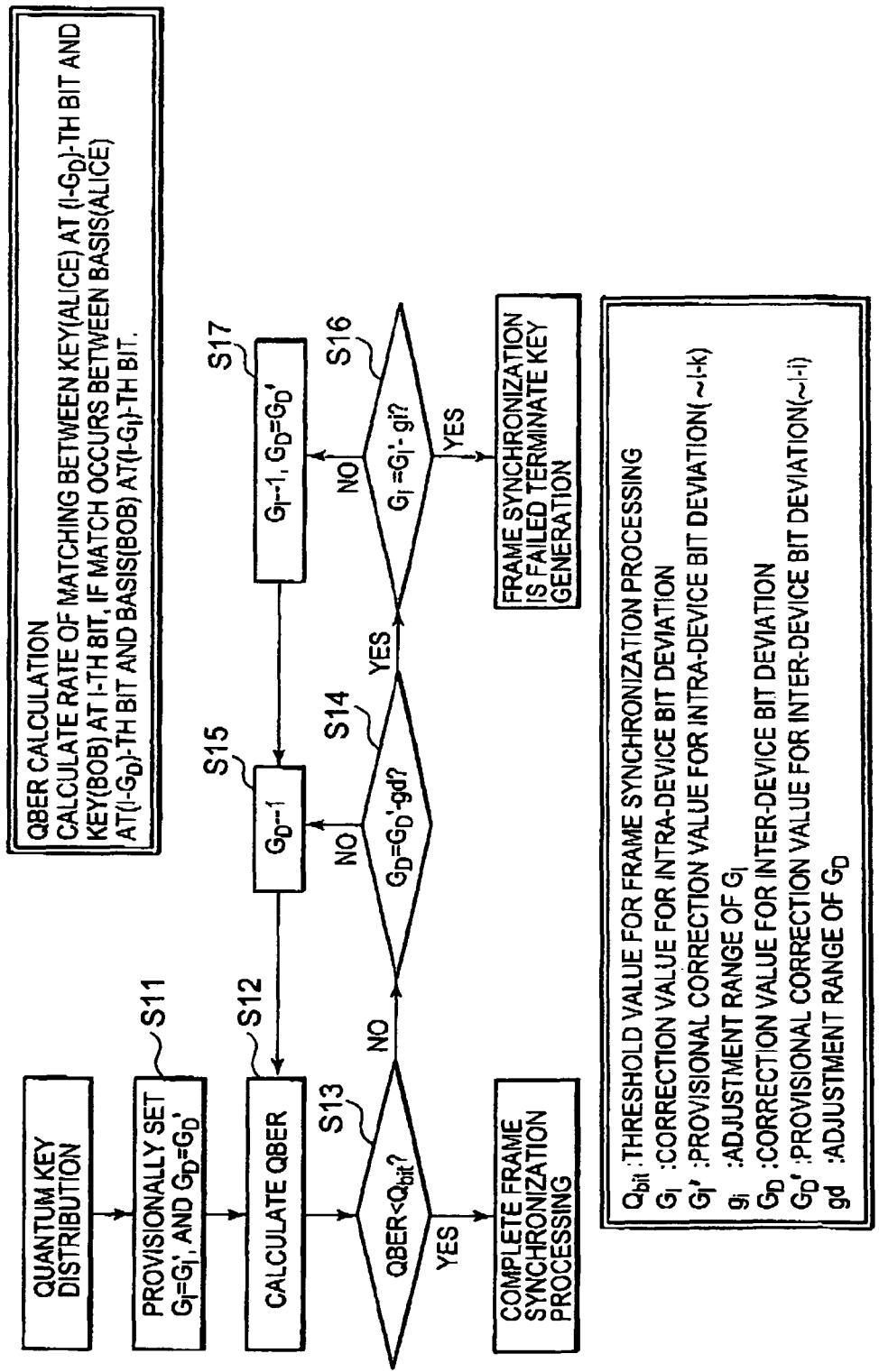
FIG. 11 is a flowchart showing an example of the frame synchronization processing according to the present invention.

FIG. 11 is a flowchart showing a second example of the frame synchronization processing according to the present invention. In this example, $G_D$ and $D_I$ are changed so that every possible combination of $G_D$ and $G_I$ is tried, and when QBER falls below the threshold value $Q_{bit}$ for frame synchronization processing, the frame synchronization is complete with the then values of $G_D$ and $G_I$.

Referring to FIG. 11, after quantum key distribution, it is provisionally set that $G_I = G_I'$ and $G_D = G_D'$ (S11). Here, $G_I'$ is a provisional correction value for an intra-device bit deviation (an estimated value of (l−k)), and $G_D'$ is a provisional correction value for an inter-device bit deviation (an estimated value of (l−i)).

Subsequently, QBER is calculated (S12) by calculating the rate of data matching between the source data stored at the (l−$G_D$)-th bit in the memory 109 on the Alice's side and the detection data stored at the l-th bit in the memory 213 on the Bob's side, for bits where a match occurs between the basis at the (l−$G_D$)-th bit in the memory 109 on the Alice's side and the basis at the (l−$G_I$)-th bit in the memory 214 on the Bob's side.

Next, the calculated QBER is compared with the threshold value $Q_{bit}$ for inter-device frame synchronization processing (S13). When QBER is equal to or larger than $Q_{bit}$ (S13: No), it is determined whether or not $G_D$ reaches the lower limit ($G_D'$−gd) of an adjustment range (S14). If $G_D$ can be further adjusted (S14: NO), $G_D$ is decremented by one (S15), and then the process returns to the step S12.

In this manner, $G_D$ is sequentially decremented by one until $G_D$ reaches ($G_D'$−gd) and, every time $G_D$ is decremented, QBER is calculated. When QBER<$Q_{bit}$ (S13: YES) during this process, the frame synchronization processing is completed.

When $G_D$ reaches ($G_D'$−gd) (S14: Yes), it is determined whether or not $G_I$ reaches the lower limit ($G_I'$−gi) of an adjustment range (S16). If $G_I$ can be further adjusted (S16: No), $G_I$ is decremented by one, and at the same time, $G_D$ is reset to the initial provisional set value $G_D'$ (S17). Then, the above-described steps S12 to S15 are repeated. That is, while $G_I$ is sequentially decremented by one, the steps S12 to S15 are repeated until $G_I$ reaches ($G_I'$−gi). Every time $G_I$ is decremented, QBER is calculated. When QBER<$Q_{bit}$ (S13: YES) during this process, the frame synchronization processing is completed.

When $G_I$ reaches ($G_I'$−gi) without QBER becoming smaller than $Q_{bit}$ (S16: Yes), since it means that QBER is not improved even after every possible value of $G_D$ and $G_I$ has been tried, it is determined that the frame synchronization is failed, and the key generation is stopped.

c) Frame synchronization processing (3)

Figure 12:
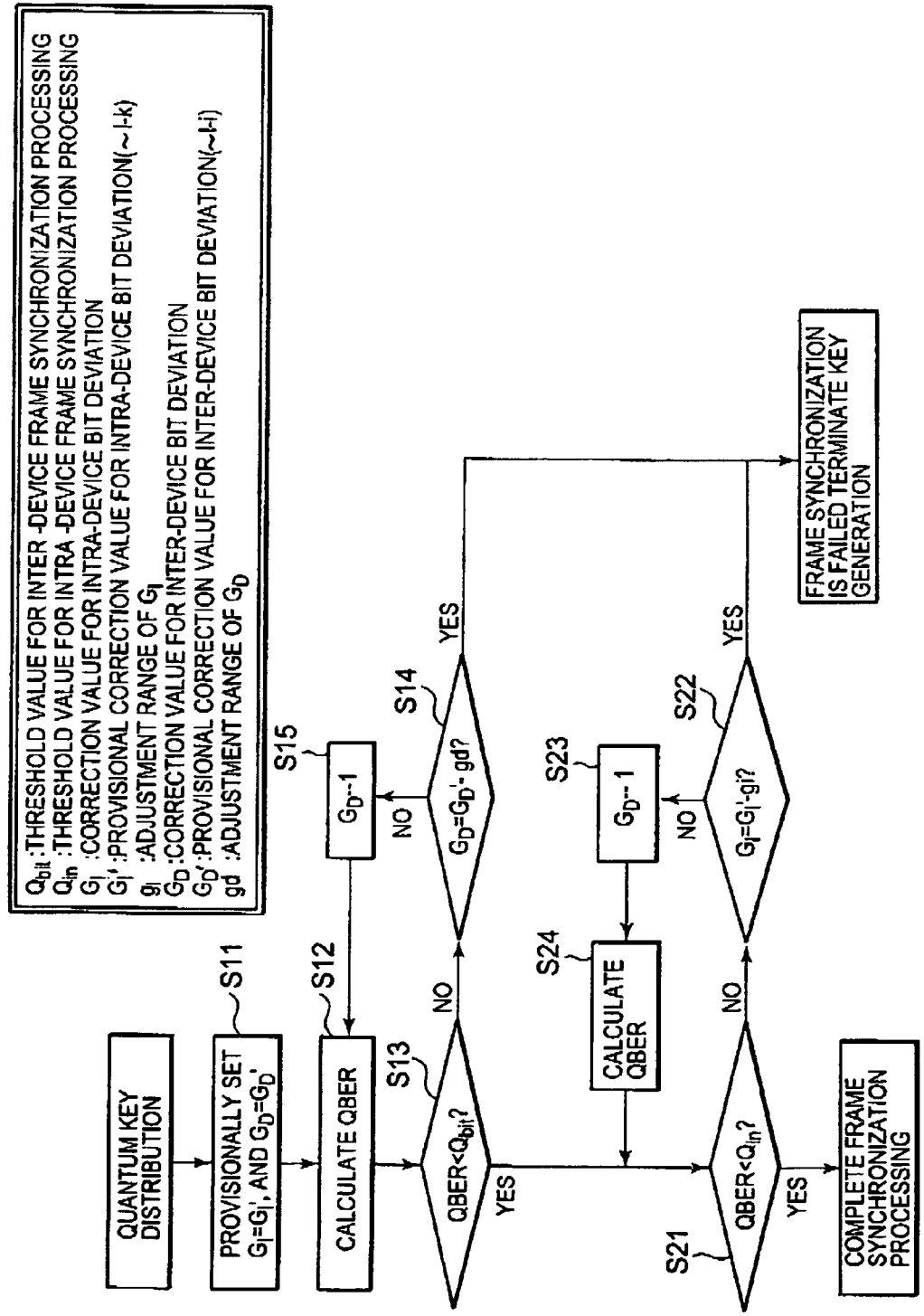
FIG. 12 is a flowchart showing another example of the frame synchronization processing according to the present invention.

FIG. 12 is a flowchart showing a third example of the frame synchronization processing according to the present invention. In this example, utilizing the fact that the error rate QBER is 50% when $G_D$ is incorrect, and is 25% when only $G_I$ is incorrect as described above, $G_D$ is determined first, and then $G_I$ is determined.

Referring to FIG. 12, after quantum key distribution, it is provisionally set that $G_I = G_I'$ and $G_D = G_D'$ (S11). Subsequently, QBER is calculated (S12) by calculating the rate of data matching between the source data stored at the (l−$G_D$)-th bit in the memory 109 on the Alice's side and the detection data stored at the l-th bit in the memory 213 on the Bob's side, for bits where a match occurs between the basis at the (l−$G_D$)- th bit in the memory 109 on the Alice's side and the basis at the $(l-G_I)$-th bit in the memory 214 on the Bob's side.

Next, the calculated QBER is compared with the threshold value $Q_{bit}$ for inter-device frame synchronization processing (S13). When QBER is equal to or larger than $Q_{bit}$ (S13: No), it is determined whether or not $G_D$ reaches the lower limit $(G_D'-gd)$ of an adjustment range (S14). If $G_D$ can be further adjusted (S14: NO), $G_D$ is decremented by one (S15), and then the process returns to the step S12.

In this manner, $G_D$ is sequentially decremented by one until $G_D$ reaches $(G_D'-gd)$ and, every time $G_D$ is decremented, QBER is calculated. When $G_D$ reaches $(G_D'-gd)$ without QBER becoming smaller than $Q_{bit}$ (S14:Yes), it is determined that the frame synchronization is failed, and the key generation is stopped.

When QBER<$Q_{bit}$ (S13: Yes), QBER is next compared with the threshold value $Q_{in}$ for intra-device frame synchronization processing (S21). When QBER is equal to or larger than $Q_{in}$ (S21: No), it is determined whether or not $G_I$ reaches the lower limit $(G_I'-gi)$ of an adjustment range (S22). If $G_I$ can be further adjusted (S22: NO), $G_I$ is decremented by one (S23), and QBER is calculated (S24), and then the process returns to the step S21.

In this manner, $G_I$ is sequentially decremented by one until $G_I$ reaches $(G_I'-gi)$ and, every time $G_I$ is decremented, QBER is calculated. When QBER<$Q_{in}$ (S21: Yes), the frame synchronization is complete. When $G_I$ reaches $(G_I'-gi)$ without QBER becoming smaller than $Q_{bit}$ (S21:Yes), it is determined that the frame synchronization is failed, and the key generation is stopped.

3.2) Modulation/Detection Phase Deviation

A quantum key distribution system of a round-trip transmission type as shown in FIG. 4 has the advantage that it is possible to suppress disturbances in the polarization direction dependency that occur along a transmission line, such as PMD (Polarization Mode Dispersion) and PDL (Polarization Dependent Loss), and also the advantage that it is possible to efficiently organize an optical interferometer required to read phase information superimposed on photon pulse.

On the other hand, because of the round-trip transmission type, there arises a need to bidirectionally use phase modulators for superimposing phase information on a photon pulse, which creates a need for high precision in the modulation timing in comparison with the case where a phase modulator is unidirectionally used. Here, if the timing of driving a phase modulator deviates from the timing when a photon pulse is passing through the phase modulator, a phase modulation of a desired amount cannot be performed, resulting in degradation in the clarity, which corresponds to the signal-to-noise ratio (SN ratio) of the interferometer. This degradation, in other words, corresponds to deterioration in QBER.

As described above, in the sender 10, one of optical pulses is phase-modulated by the phase modulator 101 when the pulse is passing through the phase modulator 101, and the optical pulses are attenuated to a single-photon state by the variable optical attenuator 103 and then transmitted to the receiver 20. In the receiver 20, the other one of the optical pulses in the single-photon state is phase-modulated by the phase modulator 205, and the optical pulses are made to interfere, whereby a photon is detected by the balanced, gated-mode photon detector APD0 or APD1 (see Tomita). It is generally known that avalanche multiplication is most likely to occur in APD if timing adjustment is made such that a photon enters immediately after the application of gate voltage to APD is started. As the timing of applying gate voltage to APD deviates from the timing of the incidence of a photon, the avalanche multiplication decreases accordingly, with the result that output current also decreases and the SN ratio is deteriorated. This deterioration, in other word, corresponds to deterioration in QBER.

Since such a timing deviation, that is, a deviation of the timing of driving the phase modulator/APD from the timing of the incidence of a photon is caused by delay variation in an optical transmission line due to change in temperature and/or delay variation among electric circuits, the degree of deviation is relatively small. Therefore, the timing of the incidence of a photon and the timing of driving the phase modulator/APD can be adjusted to the optimum position by shifting the clock phase, whereby it is possible to restore QBER to the value before deterioration.

Figure 1:
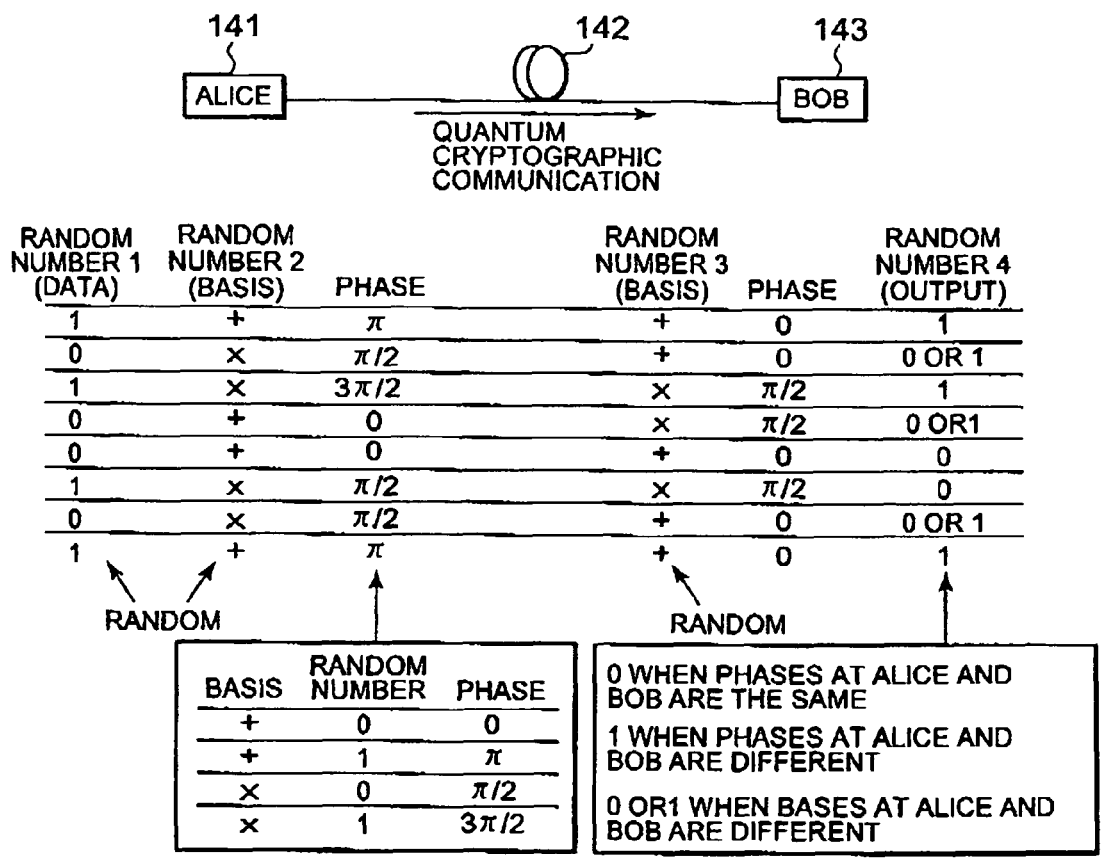
FIG. 1 is a schematic diagram showing a concept of a quantum key distribution method according to the BB84 protocol.
Figure 2:
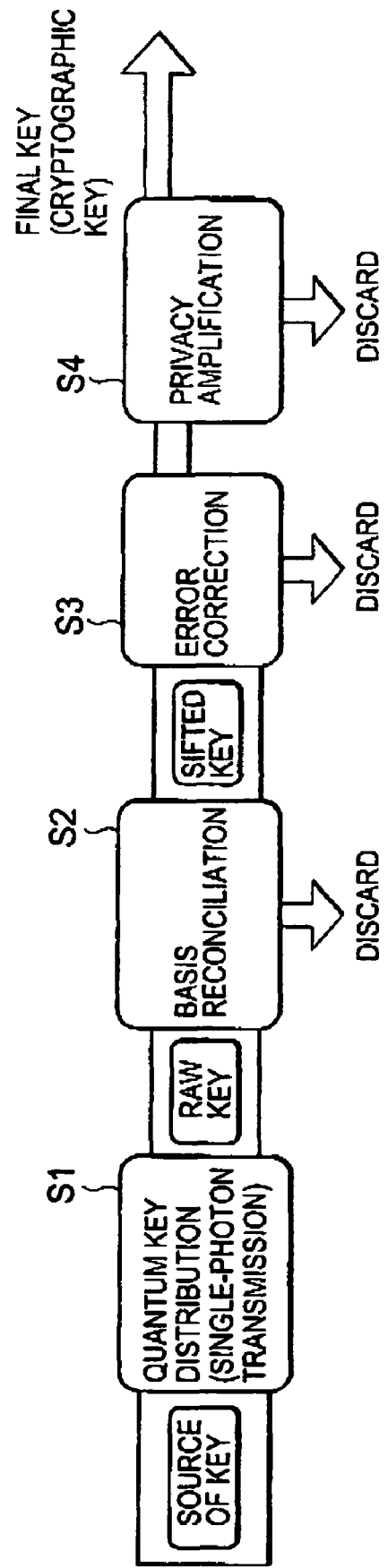
FIG. 2 is a flowchart showing a flow of quantum key generation in general.
Figure 3:
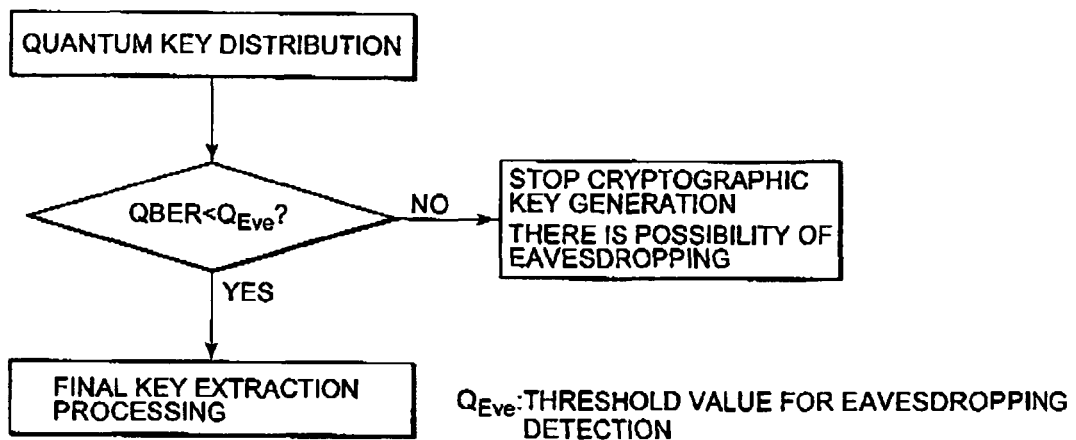
FIG. 3 is a flowchart showing an example of a conventional supervisory control method.

Several methods for adjusting the clock phase have been proposed. Maeda describes a method using a temperature-compensating delay lock loop (DLL) that detects a phase difference between a photon detection signal and a corrected clock signal, obtained by variably delaying a clock signal, and, depending on this phase difference, changes the amount of delay made on the clock signal (see FIG. 2 of Maeda). Alternatively, it is also possible to use a method by which the clock phase is sequentially shifted while QBER is monitored, and the clock phase that minimizes QBER is set as the optimum position.

QBER affected by the modulation/detection phase deviation is smaller than QBER (15% to 30%) affected by the above-described frame synchronization deviation attributable to incorrect $G_I$ and is assumed to be approximately 6% plus or minus 2% here. Therefore, as a reference to determine the phase/detection phase deviation, the threshold value $Q_{phase}$ is set at 10%.

3.3) Presence of Eavesdropper

The amount of information leaked to the eavesdropper, Eve, described in Lutkenhaus and Williamson is based on an eavesdropping scheme by the name of "Incoherent Attack (Individual Attack)." According to this eavesdropping scheme, Eve steals a certain amount of random-number information superimposed on photon pulses by entangling a quantum probe, which Eve prepares herself, with a single photon only at a time, and maintains the quantum probe until the communication for basis reconciliation is started between Alice and Bob. Eve can obtain the maximum amount of information by performing proper observation after the basis information is released.

According to Lutkenhaus and Williamson, when QBER becomes 11% to 15% or more, the amount of information Eve has obtained exceeds the amount of information Bob has obtained. These QBER threshold values are theoretically derived. With various restrictions existing in the real world taken into account, the amount of information that could be leaked to Eve may be smaller. However, the noise figure of a real device cannot be quantified theoretically, the above-mentioned QBER threshold value (11% to 15%) is generally used as the threshold value $Q_{Eve}$ for eavesdropping detection.

Apart from the above-mentioned scheme, as a more realistic eavesdropping scheme, there is another scheme such as Intercept/Resend Attack in which Eve receives and observes a photon pulse once and, based on the result of observation, resends the photon pulse to Bob. However, since the trace of Eve left on photon bits according to this scheme is more distinct than that of Incoherent Attack, the error rate is more deteriorated when eavesdropping of this scheme is performed. Therefore, if the QBER threshold value $Q_{Eve}$ is set at 10% plus, it is possible to detect eavesdropping of this scheme, in addition to Incoherent Attack.

Further, QBER is a value probabilistically determined and has a finite deviation. Therefore, a fault is determined not only in such a manner that a QBER threshold value is set and "a fault is acknowledged when QBER exceeds this threshold value," but also needs to be determined in such a manner that "a fault is acknowledged when QBER exceeds the threshold value a plurality of times consecutively." Specifically, it is known that the probability distribution of an event that occurs with a very low probability in a certain size of space during a certain length of time, agrees with the Poisson distribution. Assuming that QBER is 10%, 1000 test bits contain approximately 100 bit errors, and this number (100) of errors has a standard deviation of 10 bits. That is, the number of errors naturally fluctuates in a range of 90 to 110 bits. Therefore, QBER, which is measured based on the number of errors, also ranges from 9% to 11%. To reduce this probabilistic difference, it is necessary to increase the number of test bits, or the number of times the test is carried out.

Whatever recovery work is performed, QBER deteriorated by an act of eavesdropping cannot be restored. Therefore, when QBER measured after system recovery exceeds the threshold value $Q_{Eve}$ for eavesdropping, it is determined that "there is a possibility of eavesdropping," and the quantum key generation is stopped.

3.4) Light Source/Photo Detector Fault

QBER can also be deteriorated by a fault of a laser light source for generating photon pulses and/or a fault of a photo detector for detecting photon pulses. When the energy conversion efficiency of the laser light source is degraded, the intensity of output light is degraded, which also causes degradation in the intensity of light arriving at the photon detector, resulting in a reduced number of photon counts at the receiver. On the other hand, since the amount of noise in the receiver is constant independently of the intensity of incident light, the SN ratio of a cryptographic key is deteriorated. This deterioration, in other words, corresponds to deterioration in QBER.

Moreover, the photon detector also has various deterioration factors such as degradation in the photoelectric conversion efficiency and reduction of the bias voltage. These factors may cause a reduction in the number of photon counts even if light is received at a constant intensity. On the other hand, the amount of noise is also changed with such device deterioration, in which case the SN ratio is generally deteriorated, in most cases. That is, QBER is deteriorated even due to a fault of a photon detector.

QBER deteriorated due to deterioration of a device itself as described above cannot be restored by a recovery mechanism. Therefore, when such a fault is detected, the cryptographic key generation is stopped, with the issue of an alarm.

Note that the above-described supervisory control can be executed by any of the controller 107 in the sender 10 and the controller 211 in the receiver 20.

3.5) Advantages

According to the first embodiment of the present invention, it is possible to perform cryptographic key generation stably in quantum key distribution. In conventional quantum key distribution technologies, deterioration in the error rate (QBER) is construed all alike as the presence of an eavesdropper. However, according to the present invention, since the contents of a fault can be separated depending on the degree of deterioration in QBER, appropriate recovery processing can be carried out, which can eliminate the cases where deterioration in the error rate due to an environmental change, a communication error or the like is misidentified as the presence of an act of eavesdropping. Accordingly, since cryptographic key generation can be resumed even when deterioration occurs, which should have stopped key generation in a conventional case, it is possible to achieve the stable operation of cryptographic key generation over a long period of time.

Moreover, fault factors are separated, and recovery processing is performed depending on each fault. Therefore, the length of time required for the recovery processing can be reduced, and the proportion of time allotted to cryptographic key generation can be accordingly increased. Consequently, as a whole, the rate of cryptographic key generation can be increased.

4. Second Embodiment

In the above-described first embodiment of the present invention, the detection of a system fault is performed by monitoring QBER. According to a second embodiment of the present invention, the detection of a system fault is performed by also monitoring the rate of raw key generation in addition to QBER. Note that the configuration of a quantum key distribution system to which the second embodiment of the present invention is applied is basically similar to the system configuration shown in FIG. 4, except that the monitor 212 in the receiver 20 monitors the rate of raw key generation as well as QBER.

Although the monitoring of QBER by the monitor 212 is performed as in the first embodiment, the monitoring of the raw key generation rate $V_R$ is performed by using the number of photon counts per unit time. For example, in the system of FIG. 4, when photons are sequentially detected by the Geiger-mode-driven photo detector APD0 or APD1, corresponding bits are recorded as a raw key in the memory 213. The monitor 212 detects the raw key generation rate $V_R$ by counting the number of bits of the raw key recorded in the memory 213, at intervals of the unit time.

According to the present embodiment, the following two points are assumed as factors for deterioration in the raw key generation rate in the quantum key distribution system.

(1) Modulation/detection phase deviation: deviation of a clock phase for photon-pulse modulation and/or deviation of a clock phase for photon-pulse detection.

(2) Light source/photo detector fault: fault of a device for generating photon pulses and/or fault of a device for detecting photon pulses.

Any of the above-mentioned faults, the details of which will be described later, also may cause deterioration in the raw key generation rate. For these faults, the controller 211 presets a threshold value $V_{R-TH}$ of the raw key generation rate, a threshold value $Q_{bit}$ for frame synchronization processing, a threshold value $Q_{phase}$ for phase correction processing, and a threshold value $Q_{Eve}$ for eavesdropping detection, depending on the types of faults. $Q_{bit}$, $Q_{phase}$ and $Q_{Eve}$ are as described in the first embodiment. A specific method of determining the threshold value $Q_{R-TH}$ of the raw key generation rate will be described later.

Figure 13:
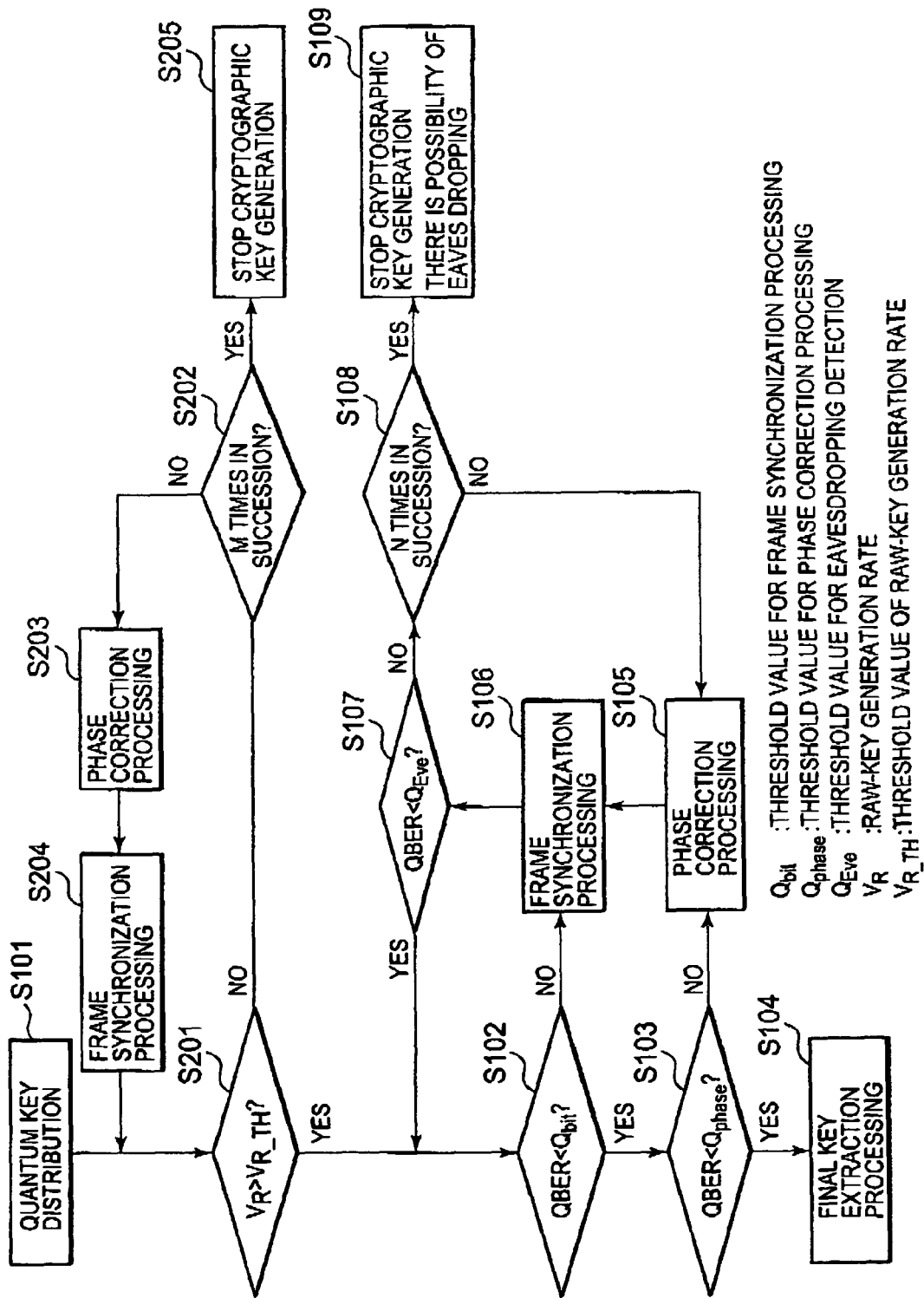
FIG. 13 is a flowchart showing a method for controlling a communication network according to a second embodiment of the present invention.

FIG. 13 is a flowchart showing a method for controlling a communication network according to the second embodiment of the present invention. According to the present embodiment, detection of a system fault and work of system recovery are performed based on the sequence shown in FIG. 13.

First, as described above, the monitor 212 monitors the raw key generation rate (rate of sharing) $V_R$ as well as the above-described QBER during quantum key distribution S101. The controller 211 compares the raw key generation rate $V_R$ with the threshold value $V_{R-TH}$ of the raw key generation rate (S201). When the raw key generation rate $V_R$ is equal to or smaller than the threshold value $V_{R-TH}$ (S201: No), it is determined whether or not this has happened a predetermined number (M) of times consecutively (S202). If this has not happened M times consecutively (S202: No), phase correction processing (S203) and frame synchronization processing (S204) are carried out. After these recovery processing steps, it is determined whether or not the raw key generation rate $V_R$ exceeds the threshold value $V_{R-TH}$ (S201). If the result is not improved, the steps S203 and S204 are repeated M times consecutively until $V_R$ becomes larger than $V_{R-TH}$. When no improvement is observed even by doing so (S202: Yes), the cryptographic key generation is stopped (S205). In this event, it is preferable to generate an alarm for indicating a possibility of eavesdropping.

When $V_R > V_{R-TH}$ (S201: Yes), the same QBER check procedure as performed in the first embodiment, shown in FIG. 5A (S102 to S109), is carried out. In this manner, after it is checked in the step S201 that no abnormality is found in the raw key generation rate, the QBER check described in the first embodiment is started.

Note that each of QBER and the raw key generation (sharing) rate $V_R$ is a value probabilistically determined and has a finite deviation. Therefore, a fault is determined not only in such a manner that a threshold value is set and "a fault is acknowledged when a value exceeds this threshold value," but also needs to be determined in such a manner that "a fault is acknowledged when a value exceeds the threshold value a plurality of times consecutively."

4.1) Modulation/Detection Phase Deviation

As described already, the photon detectors APD0 and APD1 are used in the gated mode to detect a single photon. It is generally known that avalanche multiplication is most likely to occur inside APD if timing adjustment is made such that a photon enters immediately after the application of gate voltage to APD is started. When the timing of applying gate voltage to APD deviates from the timing of the incidence of a photon, the avalanche multiplication is accordingly reduced, which causes a reduction in the output current, resulting in a reduced number of photon counts. The reduction in the number of photon counts means deterioration in the raw key generation rate.

On the other hand, depending on an optical system to be used, deviation of the modulation timing at Alice results in deviation of the timing of a photon pulse returning to Bob. Next, this phenomenon will be described.

FIG. 14A is a diagram describing the case where alternative-shift phase modulation exhibits a suitable effect in an optical system in the quantum key distribution system shown in FIG. 4, and FIG. 14B is a diagram describing the case where the alternative-shift phase modulation does not exhibit a suitable effect. For the optical system in a quantum unit of a sender, a PBS loop mirror mechanism described in Tanaka is adopted.

This scheme is an improved version of the plug and play scheme described in Ribordy and is capable of eliminating the temperature dependence of the optical system. First, polarization-dependent disturbances that may occur in the transmission line 30 are canceled out by giving a polarization rotation of σx (Pauli matrix) on the Alice's side. In addition to this, the optical-path difference in the optical interferometer is automatically adjusted. Here, as a method of giving a polarization rotation of σx, a PBS loop mirror is configured, with which a difference of π is made between the modulation depths to be respectively given to photon pulses entering the phased modulator 101 from the mutually opposite sides.

When the polarization rotation of σx is accomplished by the phase difference of π here, as shown in FIG. 14A, the polarization direction of a photon pulse when it is returned to Bob intersects with the polarization direction of the photon pulse when it was output from Bob. Therefore, as described already, a photon pulse passing along a short path $P_S$ in the outgoing journey passes along a long path $P_L$ in the return journey, whereas a photon pulse passing along the long path $P_L$ in the outgoing journey passes along the short path $P_S$ in the return journey. Accordingly, the need for the adjustment of the optical path difference can be eliminated.

However, when the value of the phase difference of π to be given at the PBS loop mirror deviates, as shown in FIG. 14B, the polarization direction of a photon pulse when it is returned to Bob is not orthogonal to the polarization direction of the photon pulse when it was output from Bob. Therefore, some photon pulse passing along the short path $P_S$ in the outgoing journey passes along the short path $P_S$ also in the return journey, and some photon pulse passing along the long path $P_L$ in the outgoing journey passes along the long path $P_L$ also in the return journey. In this case, since the optical paths of the photon pulses are greatly different from those in the normal state, the timing of the arrival of a photon at the photon detector APD deviates, resulting in a reduction in the number of photon counts, as well as deterioration in the raw key generation rate. As described above, the raw key generation rate is also deteriorated when a deviation of the modulation timing occurs in Alice.

Since the above-described phase deviation is such a problem that the deteriorated raw key generation rate can be restored to its original rate by resetting the modulation/detection phase, the phase correction processing is carried out when this type of fault is detected.

4.2) Light Source/Photo Detector Fault

The raw key generation rate is also deteriorated when a fault occurs in the laser light source 202 and/or photon detectors APD. As described in the first embodiment, the number of photon counts is reduced due to degradation in the energy conversion efficiency of the laser light source, degradation in the photo-electric conversion efficiency of the photon detector APD, reduction of the bias voltage, and the like. This reduction in the number of photon counts corresponds to deterioration in the raw key generation rate.

The raw key generation rate deteriorated due to deterioration of a device itself as described above cannot be restored by a recovery mechanism. Therefore, when such a fault is detected, the cryptographic key generation is stopped with the issue of an alarm.

4.3) Threshold Value $V_{R-TH}$ of Raw Key Generation Rate

The threshold value $V_{R-TH}$ of the raw key generation rate is determined with consideration of variation in the rate at the time of initial setup. For example, in the case of a raw key generation rate of 10000 bits/s, variations in a range of approximately 100 bits/s (σ=100) can be generated statistically. Therefore, if the threshold value is set within a range of 3σ, the threshold value $V_{R-TH}$ of the raw key generation rate is set at 9700 (=10000*0.97) bits/s.

4.4) Modified Examples

In the supervisory control shown in FIG. 13, the fault detection and recovery mechanism related to the key generation rate (S201 to S205) are placed previous to those related to QBER (S102 to S109). However, the present invention is not limited to this.

FIG. 15 is a flowchart showing a method for controlling a communication network according to a modified example of the second embodiment of the present invention. In this modified example, after the fault detection and recovery related to QBER (S102 to S109) are carried out, the fault detection and recovery related to the key generation rate (S201, S202 and S205) are carried out.

Specifically, in the step S201, phase correction processing (S105), frame synchronization processing (S104) and determination processing (S107, S102 and S103) are repeated M times consecutively until $V_R$ becomes larger than $V_{R-TH}$. When no improvement is made even by doing so (S202: Yes), the cryptographic key generation is stopped (S205). In this event, it is preferable to generate an alarm indicating a possibility of eavesdropping.

Note that although the raw key generation rate is monitored in the second embodiment, the present invention is not limited to this. It is possible to detect each fault through a similar procedure, by monitoring the rate of sifted key generation or the rate of final key generation.

Incidentally, the above-described supervisory control can be executed by any of the controller 107 in the sender 10 and the controller 211 in the receiver 20.

3.5) Advantages

According to the second embodiment of the present invention, the detection of a system fault is performed by monitoring the raw key generation rate, as well as monitoring deterioration in QBER. Therefore, in addition to the advantages according to the first embodiment, more efficient cryptographic key generation can be performed. In particular, since deterioration in the rate of cryptographic key generation can be monitored, it is possible to further improve the efficiency of cryptographic key generation as a whole.

5. Third Embodiment

In a third embodiment of the present invention, fault factors are separated by monitoring the amount of change in QBER. The configuration of a quantum key distribution system to which the third embodiment of the present invention is applied is basically similar to the system configuration shown in FIG. 4, except that the monitor 212 in the receiver 20 calculates the amount of change in QBER (hereinafter, referred to as QBER change rate).

Figure 16:
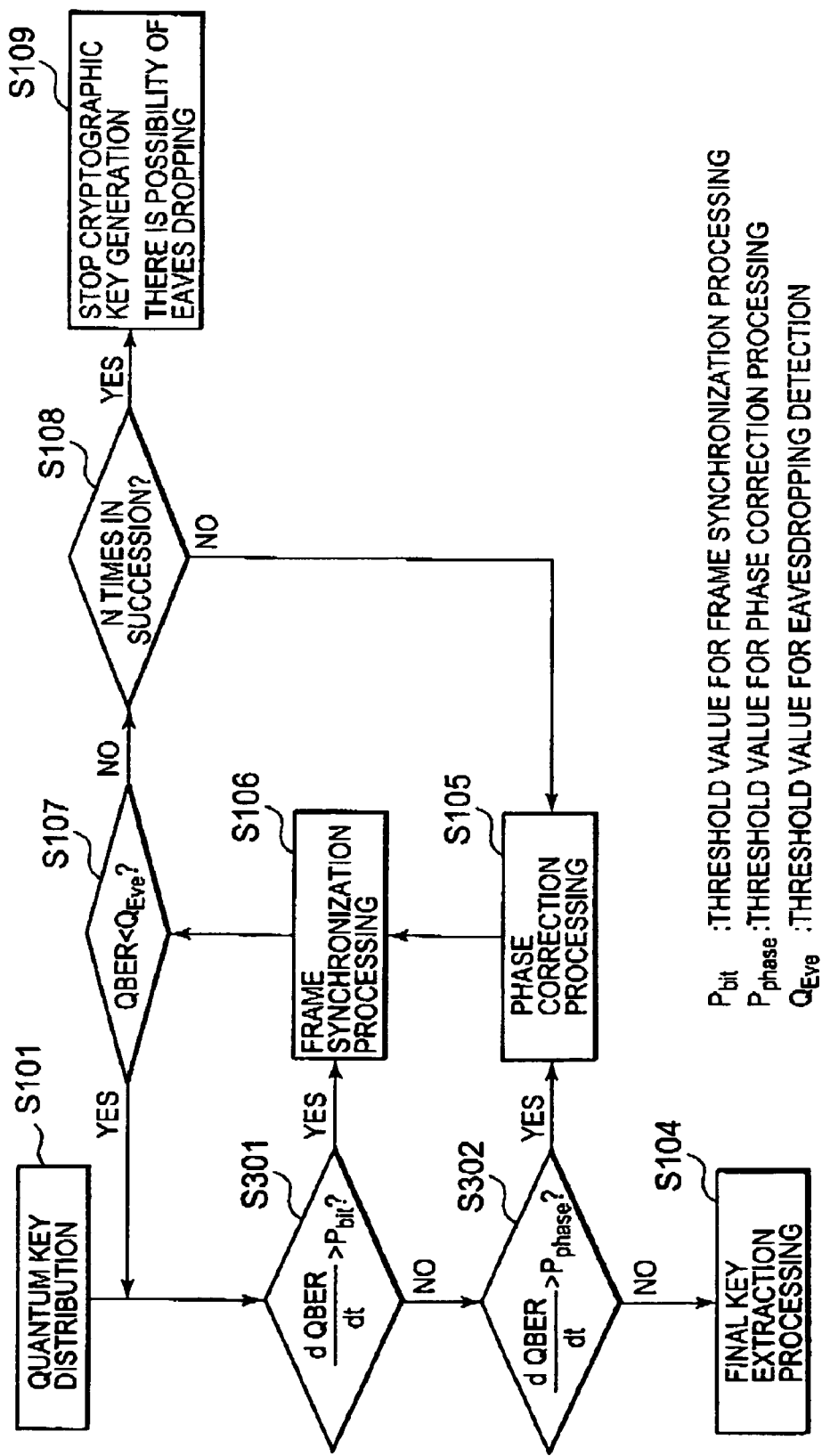
FIG. 16 is a flowchart showing a method for controlling a communication network according to a third embodiment of the present invention.

FIG. 16 is a flowchart showing a method for controlling a communication network according to the third embodiment of the present invention. Note that steps similar to those in the first embodiment are denoted by the same reference symbols and numerals as those used in the first embodiment, and description thereof will be omitted.

Referring to FIG. 16, the monitor 212 monitors QBER as described above and calculates a difference from the past QBER stored in the memory 213, thereby calculating the QBER change rate (dQBER/dt). The controller 211 monitors the QBER change rate at predetermined time intervals. The calculated QBER change rate dQBER/dt is first compared with a change rate threshold value $P_{bit}$ for frame synchronization processing (S301). When dQBER/dt is equal to or smaller than $P_{bit}$, dQBER/dt is further compared with a change rate threshold value $P_{phase}$ for phase correction processing (S302). When dQBER/dt is equal to or smaller than $P_{phase}$ (S302: Yes), each processing in the subsequent flow of key generation, including error correction, remaining-error detection and privacy amplification here, is carried out (S104).

On the other hand, when dQBER/dt≦$P_{bit}$ (S301: No) but dQBER/dt>$P_{phase}$ (S302: Yes), phase correction processing (S105) and further frame synchronization processing (S106) are carried out. When dQBER/dt>$P_{bit}$ (S301: Yes), the frame synchronization processing are carried out (S106). The other processing is similar to that shown in FIG. 5A in the first embodiment. Note that the check of the raw key generation rate described in the second embodiment can be added to the above-described steps of the third embodiment.

Incidentally, QBER is a value probabilistically determined and has a finite deviation. Therefore, a fault is determined not only in such a manner that a threshold value is set and "a fault is acknowledged when QBER exceeds this threshold value," but also needs to be determined in such a manner that "a fault is acknowledged when QBER exceeds the threshold value a plurality of times consecutively."

5.1) Frame Sync Deviation and Modulation/Detection Phase Deviation

Figure 17B:
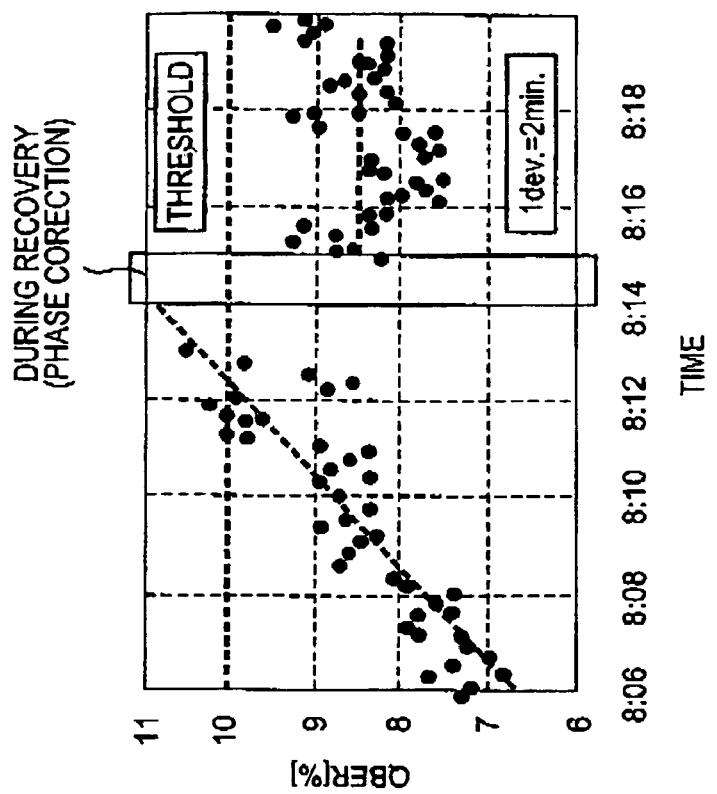
FIG. 17B is a graph showing change in the measurement value of QBER when a modulation/detection phase deviation occurs and improved QBER after recovery.
Figure 17A:
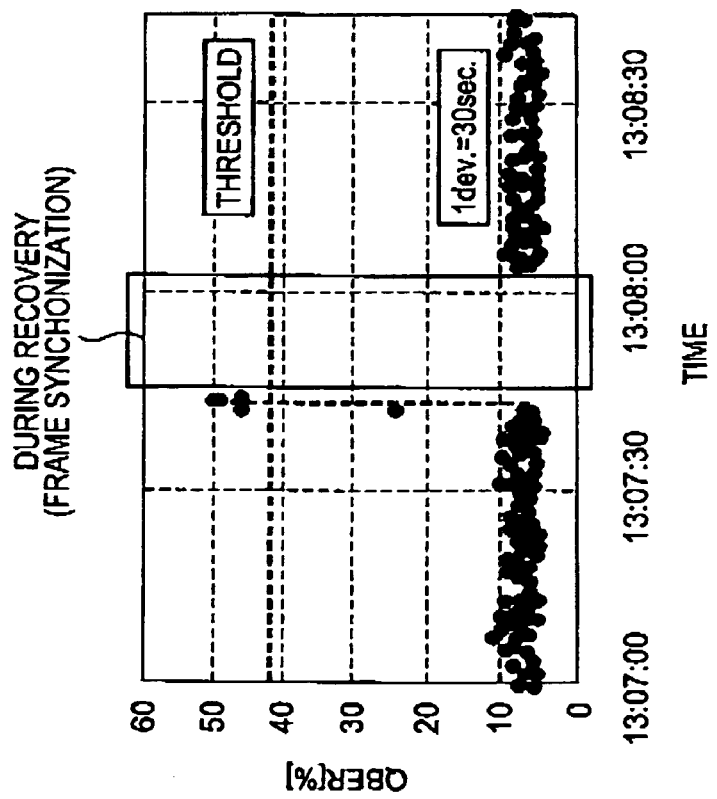
FIG. 17A is a graph showing change in the measurement value of QBER when a frame synchronization deviation occurs and improved QBER after recovery.

FIG. 17A is a graph showing change in the measurement value of QBER when a frame synchronization deviation occurs, and improved QBER after recovery. FIG. 17B is a graph showing change in the measurement value of QBER when a modulation/detection phase deviation occurs, and improved QBER after recovery.

As can be seen from these graphs, deterioration in QBER due to a modulation/detection phase deviation is slow, whereas deterioration in QBER due to a frame synchronization deviation is steep. This is because a major factor for the frame synchronization deviation is a computation error or a communication error, which brings about a state where QBER is calculated by the comparison of bit strings having no correlation with each other. In other words, if the bit recognition deviates from the correct position by even one bit, QBER is immediately deteriorated.

On the other hand, a major factor for the modulation/detection phase deviation is delay variation in an optical transmission line caused by change in temperature and/or delay variation among electric circuits. Therefore, in addition to the fact that the change (deviation) itself is slow, it hardly happens that it suddenly becomes impossible to modulate a photon pulse or a photon pulse suddenly goes out of the reception gate, even if the modulation/detection phase is changed to a certain degree, because the modulation signal and the gate signal to a photon detector have a certain length of transition time (rising/trailing). Therefore, by monitoring the time differential of QBER, a fault factor can be identified as follows. Specifically, when the differential value is large, a fault is caused by a frame synchronization deviation, and when the differential value is small, a fault is caused by a modulation/detection phase deviation.

5.2) Threshold Values $P_{bit}$ and $P_{phase}$

The QBER deterioration due to a frame synchronization deviation is steep as shown in FIG. 17A. Therefore, from the state capable of key generation (QBER is 5% at most), QBER is suddenly deteriorated to nearly 50%. In this example, QBER increases by approximately 45% for one second. On the other hand, The QBER deterioration due to a modulation/detection phase deviation is slow as shown in FIG. 17B. In this example, QBER increases by approximately only 5% for seven seconds.

Accordingly, these can be sufficiently discriminated from each other by setting the change rate threshold value $P_{bit}$ for frame synchronization processing ($P_{bit}$=ΔQBER/Δt) at ~45%/s, and by setting the change rate threshold value $P_{phase}$ for phase correction processing ($P_{phase}$=ΔQBER/Δt) at ~0.01%/s.

Note that although the differential value of QBER with respect to time is monitored to identify a fault factor in the present embodiment, the present invention is not limited to this. Any configuration can be employed as long as fault factors can be separated based on the behavior of change in QBER observed by monitoring the change in QBER for a specific length of time. For example, it is possible to perform similar supervisory control by using the amount of change in QBER itself within a certain period of time, or by using a result of fitting a change in QBER piecewise with a linear equation.

Incidentally, the above-described supervisory control can be carried out any of the controller 107 in the sender 10 and the controller 211 in the receiver 20.

5.3) Advantages

According to the third embodiment of the present invention, the types of fault factors are detected by monitoring a QBER change rate. Therefore, in addition to the advantages according to the first embodiment, stable and reliable fault detection can be performed.

6. Fourth Embodiment

According to a fourth embodiment of the present invention, modulation/detection phase correction is performed by the sender 10 and the receiver 20 separately. In the case of a system of a round-trip transmission type as shown in FIG. 4, a clock or clock-related signal is also transmitted from the receiver 20 in parallel with the single-photon pulses, turned round at the sender 10, and then returned to the receiver 20, as described already.

The photon pulses and clock signal are wavelength-multiplexed by the wavelength division multiplexing (WDM) technology and propagated along the transmission line 30. Therefore, the extension/contraction of the transmission line 30 occurring along with change in temperature hardly causes a timing deviation between the photon pulses and clock signal. However, inside a device, the photon pulses and clock signal must be propagated along separate lines to electric circuits, and accordingly the delay difference between these signals varies with change in temperature. Here, the clock signal for photon detection to be given to the photon detectors APD0 and APD1 in the receiver 20 propagates a longer distance than the clock signal for phase modulation to be given to the phase modulator 101 in the sender 10. Therefore, the timing of driving the photon detector APD in the receiver 20 more greatly deviates from the timing of the arrival of a photon pulse.

Accordingly, the present embodiment adopts such a procedure that, when a need for phase correction arises, phase correction processing is first carried out for the receiver 20 (Bob), and if no improvement is made by this processing, phase correction processing is carried out for the sender 10 (Alice). Hereinafter, the procedure will be described specifically.

Figure 18:
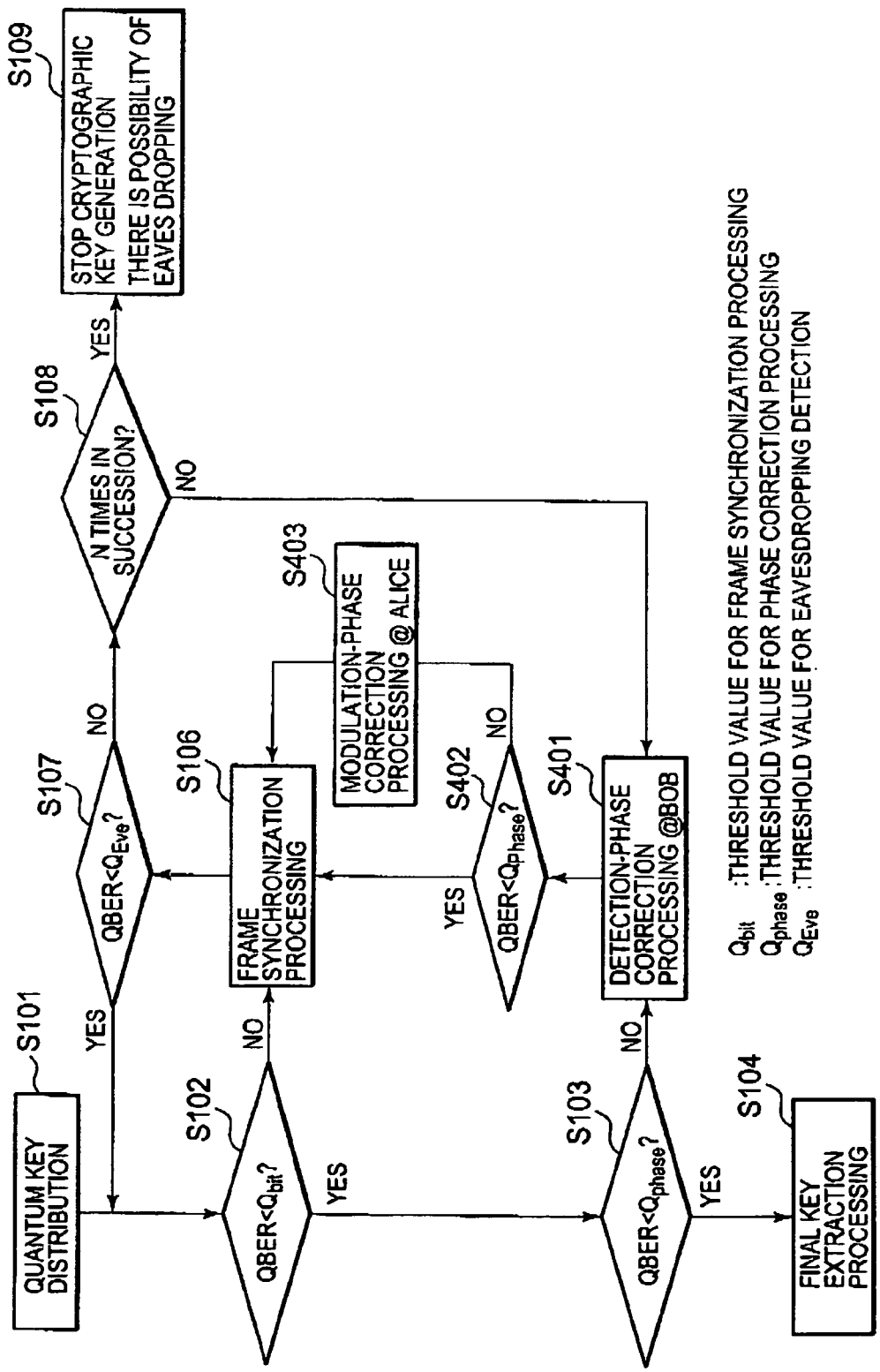
FIG. 18 is a flowchart showing a method for controlling a communication network according to a fourth embodiment of the present invention.

FIG. 18 is a flowchart showing a method for controlling a communication network according to the fourth embodiment of the present invention. Note that steps similar to those of the first embodiment are denoted by the same reference symbols and numerals as those used in the first embodiment, and description thereof will be omitted. When it is determined in the step S103 as described above that QBER is deteriorated more than the threshold value $Q_{phase}$ for phase correction processing, the controller 211 controls the phase controller 210 in the receiver 20 so that phase correction processing is carried out (S401).

When the phase correction processing S401 in the receiver 20 is completed, the controller 211 compares again QBER with the threshold value $Q_{phase}$ for phase correction processing (S402). If QBER is improved (QBER<$Q_{phase}$), frame synchronization processing is next carried out (S106), and thereafter subsequent processing is performed as described already. When it is determined in the step S402 that QBER is not improved (S402: No), the controller 211 instructs the controller 107 in the sender 10 so that phase correction processing is carried out in the sender 10 (S403). Subsequently, frame synchronization processing is carried out (S106), and thereafter subsequent processing is performed as described already.

As described above, when QBER is deteriorated, phase correction is first performed on the clock for photon detection on the Bob's side. By doing so, it is possible to reduce the time required for phase correction and therefore to carry out phase correction efficiently.

Incidentally, the above-described supervisory control may be performed by any of the controller 107 in the sender 10 and the controller 211 in the receiver 20.

7. Fifth Embodiment

The present invention is not only applied to the above-described round-trip transmission types, but can be applied to a quantum key distribution system of a one-way transmission type similarly.

Figure 19:
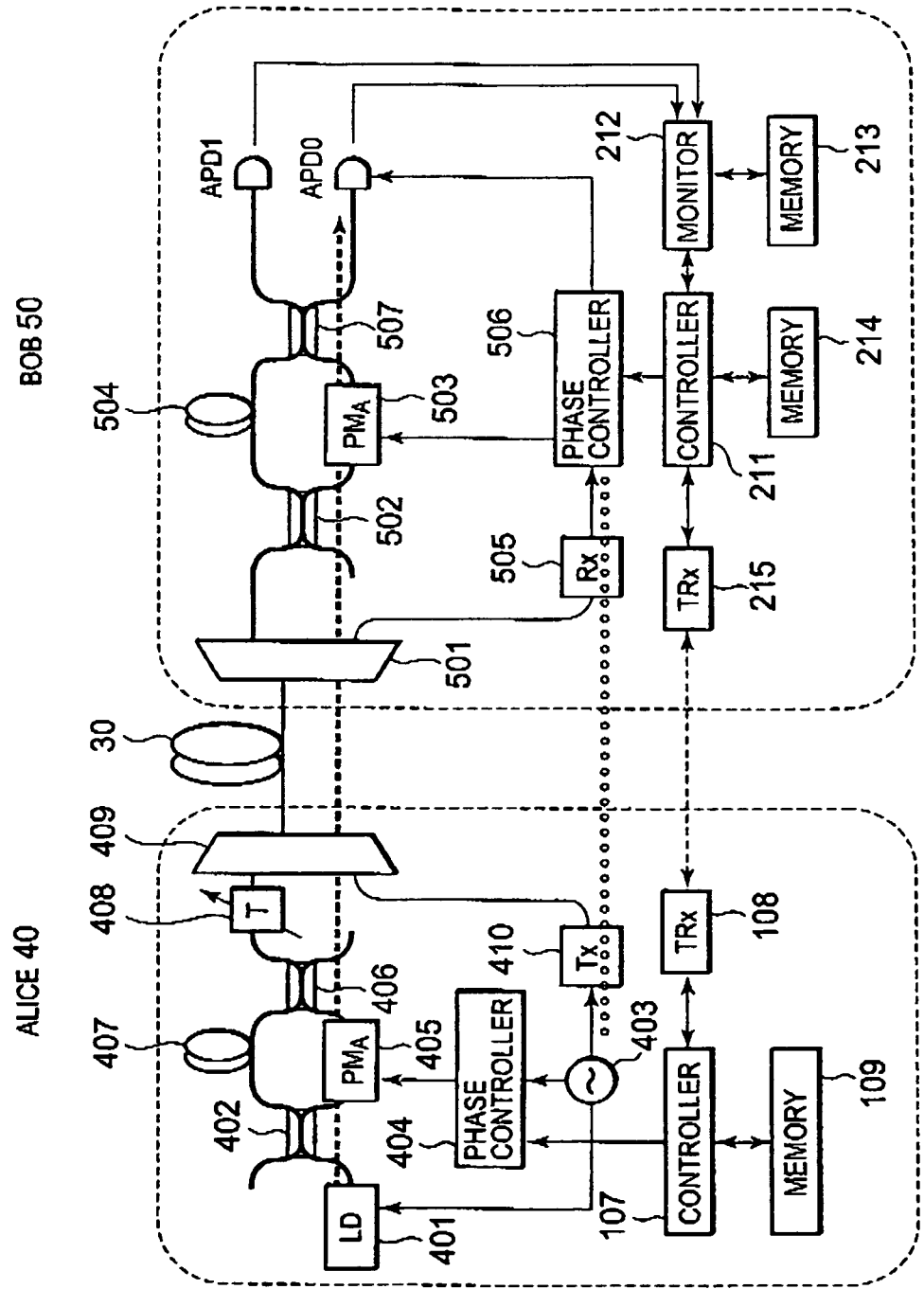
FIG. 19 is a block diagram showing a configuration of a one-way quantum key distribution system according to a fifth embodiment of the present invention.

FIG. 19 is a block diagram showing a configuration of a quantum key distribution system of a one-way transmission type according to a fifth embodiment of the present invention. Note that since a monitor, memories and control systems related to the operation of the present embodiment are similar to those shown in FIG. 4, the same reference symbols and numerals as in FIG. 4 are used for these parts in FIG. 19.

In the quantum key distribution system according to the present embodiment, a sender (Alice) 40 and a receiver (Bob) 50 are optically connected through the optical fiber transmission line 30, and a laser light source 401 and a clock source 403 are provided to the sender 40.

The laser light source 401 outputs a sequence of optical pulses in accordance with a reference clock supplied from the clock source 403. An optical pulse is split into two at an optical coupler 402. One of the two, an optical pulse P1, is phase-modulated by a phase modulator 405, which is placed in a short path, and then arrives at an optical coupler 406. The other one, an optical pulse P2, goes along a long path 407 and arrives at the optical coupler 406. Therefore, the phase-modulated optical pulse P$1^{*A}$ and the delayed optical pulse P2 become temporally preceding and following double pulses, which are transmitted to the transmission line 30 after passing through a variable optical attenuator 408 and a wavelength multiplexer/demultiplexer 409.

A phase modulator 404 outputs a phase control signal to a phase modulator 405 in accordance with the reference clock from the clock source 403. In accordance with the phase control signal, the phase modulator 405 phase-modulates the passing optical pulse P1. The depth of phase modulation depends on a combination of a random number and a basis stored in the memory 109 as described in the first embodiment. The reference clock from the clock source 403 is transmitted to the transmission line 30 by an optical transmitter 410 after passing through the wavelength multiplexer/demultiplexer 409, as an optical signal at a wavelength different from that of the laser light source 401. Incidentally, as in the first embodiment, the controller 107 in the sender 40 and the controller 211 in the receiver 50 exchange data required for frame synchronization and phase correction, control signals and the like similarly by wavelength multiplexing transmission, via the optical transceivers 108 and 215.

In the receiver 50, the optical pulses P$1^{*A}$ and P2 are input to an optical system similar to that of the sender 40 after passing through a wavelength multiplexer/demultiplexer 501. Specifically, the optical pulses P$1^{*A}$ and P2 are split at an optical coupler 502 and individually go along a long path 504 or go through a phase modulator 503 placed in a short path similarly to that in the sender 40. Then, these pulses are combined at an optical coupler 507. In this case, it is only when the optical pulse P$1^{*A}$ having passed along the short path (phase modulator 405) in the sender 40 and the long path 504 in the receiver 50 and the optical pulse P$2^{*B}$ having passed along the long path 407 in the sender 40 and the short path (phase modulator 503) in the receiver 50 arrive at the optical coupler 507 at the same time and interfere with each other, that any one of the photo detectors APD0 and APD1 can detect the optical pulse depending on the difference between the depths of phase modulations at the sender 40 and the receiver 50.

A phase controller 506 outputs a phase control signal to the phase modulator 503 in accordance with the reference clock received from the sender 40 through an optical receiver 505. In accordance with the phase control signal, the phase modulator 503 phase-modulates the passing optical signal. The depth of phase modulation depends on a basis stored in the memory 214 as described in the first embodiment.

Data thus detected by the photo detectors APD0 and APD1 are written in the memory 213 through the monitor 212. The supervisory control by the monitor 212 and controller 211 is carried out as described in the foregoing embodiments and has similar effects.

For the system of the one-way communication type according to the present embodiment as well, a configuration is adopted in which the clock-signal system is transmitted in parallel with the single-photon pulses from the sender 40 to the receiver 50. Therefore, similarly to the above-described fourth embodiment, since the clock signal for photon detection to be given to the photon detectors APD0 and APD1 in the receiver 50 propagates a longer distance than the clock signal for phase modulation to be given to the phase modulator 405 in the sender 40, the timing of driving the photon detector more greatly deviates from the timing of the arrival of a photon pulse.

Moreover, the frequency of the clock signal for phase modulation is several times higher than the system frequency. Therefore, even in a system of 62.5 MHz, which is the highest rate at present, the clock signal for phase modulation requires a precision of approximately 250 MHz (4 ns). On the other hand, the clock signal given to a photon detector APD, which is generally driven in the gated mode, requires a timing precision of several hundreds ps. For this reason, even in a system of a one-way transmission type, the deviation of the photon detection phase occurring in the receiver 50 is more dominant as a factor for QBER deterioration. Accordingly, in the one-way system as well, when QBER is deteriorated, phase correction is first performed on the clock phase for photon detection on the Bob's side. By doing so, it is possible to reduce the time required for phase correction and therefore to carry out phase correction efficiently.

Incidentally, the above-described supervisory control may be performed by any of the controller 107 in the sender 10 and the controller 211 in the receiver 20.

The present invention can be utilized for highly confidential communications using shared cryptographic key distribution technologies, typified by quantum key distribution technologies. For a quantum key distribution method, any of the one-way transmission type and the round-trip transmission type may be employed.

The invention claimed is:

1. A method for controlling a communication system based on at least one monitored item of the communication system in which a first communication device communicates with a second communication device through a transmission line, the method comprising:

setting at least two fault-detection thresholds for the monitored item, wherein the fault-detection thresholds are used for detecting different types of faults;

transmitting first data from the first communication device to the second communication device through the transmission line according to an operation timing synchronized between the first and second communication devices, thereby the second communication device receives second data from the first communication device through the transmission line;

generating a measured value for each monitored item based on the first data and the second data;

comparing the measured value with at least one of the fault-detection thresholds set for the monitored item to determine whether a fault occurs; and when it is determined that a fault occurs, performing recovery of the communication system depending on the fault based on the first data and the second data.

2. The method according to claim 1, further comprising:

generating shared data between the first and second communication devices based on second data which the second communication device has received from the first communication device.

3. The method according to claim 2, wherein the monitored item is an error rate which is obtained by comparing a part of the first data stored in the first communication device with a part of the second data stored in the second communication device.

4. The method according to claim 3, wherein another monitored item is a data generation rate of the second data which has been received by the second communication device.

5. The method according to claim 4, wherein when the measured value of the data generation rate is lower than a first fault-detection threshold, timing correction and frame synchronization are performed as the recovery, wherein the timing correction comprises:

generating the error rate while changing the operation timing in at least one of the first communication device and the second communication device; and searching for an operation timing which minimizes the error rate, and the frame synchronization comprises:

generating an error rate by comparing a part of the first data stored in the first communication device with a part of the second data stored in the second communication device while changing bit-to-bit correspondence between the first data and the second data; and searching for an operation timing which minimizes the error rate.

6. The method according to claim 5, wherein when the measured value of the data generation rate is lower than the first fault-detection threshold consecutively a predetermined number of times, shared-data generation is stopped.

7. The method according to claim 6, wherein when the shared data generation is stopped, an alarm is raised to indicate a possibility of eavesdropping.

8. The method according to claim 4, wherein when the measured value of the data generation rate is lower than a first fault-detection threshold, timing correction and frame synchronization are performed as the recovery, wherein the timing correction comprises:

generating the error rate while changing the operation timing in at least one of the first communication device and the second communication device; and searching for an operation timing which minimizes the error rate, and the frame synchronization comprises:

generating an error rate by comparing a part of the first data stored in the first communication device with a part of the second data stored in the second communication device while changing bit-to-bit correspondence between the first data and the second data; and searching for a bit-to-bit correspondence providing an error rate lower than a second fault-detection threshold.

9. The method according to claim 8, wherein when the measured value of the data generation rate is lower than the first fault-detection threshold consecutively a predetermined number of times, shared-data generation is stopped.

10. The method according to claim 2, wherein the monitored item is a change rate of an error rate obtained by comparing a part of the first data stored in the first communication device with a part of the second data stored in the second communication device.

11. The method according to claim 2, wherein when the measured value of the monitored item exceeds a first fault-detection threshold, frame synchronization is performed as the recovery, wherein the frame synchronization comprises:
 generating an error rate by comparing a part of the first data stored in the first communication device with a part of the second data stored in the second communication device while changing bit-to-bit correspondence between the first data and the second data; and
 searching for a bit-to-bit correspondence which minimizes the error rate.

12. The method according to claim 11, wherein when the measured value of the monitored item is equal to or lower than the first fault-detection threshold and exceeds a second fault-detection threshold, timing correction is performed as the recovery, wherein the timing correction comprises:
 generating the error rate while changing the operation timing in at least one of the first communication device and the second communication device; and
 searching for an operation timing which minimizes the error rate.

13. The method according to claim 2, wherein when the measured value of the monitored item exceeds a first fault-detection threshold, frame synchronization is performed as the recovery, wherein the frame synchronization comprises:
 generating an error rate by comparing a part of the first data stored in the first communication device with a part of the second data stored in the second communication device while changing bit-to-bit correspondence between the first data and the second data; and
 searching for a bit-to-bit correspondence providing an error rate lower than the first fault-detection threshold.

14. The method according to claim 13, wherein when the measured value of the monitored item is equal to or lower than the first fault-detection threshold and exceeds a second fault-detection threshold, timing correction is performed as the recovery, wherein the timing correction comprises:
 generating the error rate while changing the operation timing in at least one of the first communication device and the second communication device; and
 searching for an operation timing which minimizes the error rate.

15. The method according to claim 2, wherein when the measured value of the monitored item is equal to or lower than the first fault-detection threshold and exceeds a second fault-detection threshold, timing correction and frame synchronization are performed as the recovery,
 wherein the timing correction comprises:
 generating the error rate while changing the operation timing in at least one of the first communication device and the second communication device; and
 searching for an operation timing which minimizes the error rate, and
 the frame synchronization comprises:
 generating an error rate by comparing a part of the first data stored in the first communication device with a part of the second data stored in the second communication device while changing bit-to-bit correspondence between the first data and the second data; and
 searching for an operation timing which minimizes the error rate.

16. The method according to claim 2, wherein when the measured value of the monitored item is equal to or lower than the first fault-detection threshold and exceeds a second fault-detection threshold, timing correction and frame synchronization are performed as the recovery,
 wherein the timing correction comprises:
 generating the error rate while changing the operation timing in at least one of the first communication device and the second communication device; and
 searching for an operation timing which minimizes the error rate, and
 the frame synchronization comprises:
 generating an error rate by comparing a part of the first data stored in the first communication device with a part of the second data stored in the second communication device while changing bit-to-bit correspondence between the first data and the second data; and
 searching for a bit-to-bit correspondence providing an error rate lower than the first fault-detection threshold.

17. The method according to claim 2, wherein when the measured value of the monitored item exceeds a predetermined fault-detection threshold even after the recovery has been repeated consecutively a predetermined number of times, shared-data generation is stopped.

18. The method according to claim 17, wherein when the shared data generation is stopped, an alarm is raised to indicate a possibility of eavesdropping.

19. A communication system in which a first communication device communicates with a second communication device through a transmission line, wherein the communication system is controlled based on at least one monitored item, wherein
 the first communication device comprises:
 a first memory for storing first data to be transmitted;
 a first sync section for synchronizing the second communication device; and
 a first communication section for transmitting the first data to the second communication device through the transmission line according to an operation timing synchronized between the first and second communication devices, and
 the second communication device comprises:
 a second sync section for synchronizing the first communication device;
 a second communication section for receiving second data from the first communication device through the transmission line according to the operation timing;
 a monitor for generating a measured value for each monitored item based on the first data and the second data and comparing the measured value with at least one of at least two fault-detection thresholds set for the monitored item to determine whether a fault occurs, wherein the fault-detection thresholds are used for detecting different types of faults; and
 a recovery section performing recovery of the communication system depending on the fault when it is determined that a fault occurs.

20. The system according to claim 19, wherein
 the first communication device further comprises a first control section for generating shared data between the first and second communication devices based on the second data, and the second communication device further comprises a second control section for generating the shared data between the first and second communication devices based on the second data.

21. A memory device encoded with a computer-readable program instructing a computer to control a communication system based on at least one monitored item of the communication system in which a first communication device communicates with a second communication device through a transmission line, the program instructing the computer to perform or have performed the steps of:

setting at least two fault-detection thresholds for each monitored item, wherein the fault-detection thresholds are used for detecting different types of faults;

transmitting first data from the first communication device to the second communication device through the transmission line according to an operation timing synchronized between the first and second communication devices, thereby the second communication device receives second data from the first communication device through the transmission line;

generating a measured value for each monitored item based on the first data and the second data;

comparing the measured value with at least one of the fault-detection thresholds set for the monitored item, to determine whether a fault occurs; and when it is determined that a fault occurs, performing recovery of the communication system depending on the fault based on the first data and the second data.

* * * * *